(12) United States Patent  
Ishii

(10) Patent No.: US 9,081,784 B2  
(45) Date of Patent: Jul. 14, 2015

(54) DELTA INDEXING METHOD FOR HIERARCHY FILE STORAGE

(75) Inventor: Yohsuke Ishii, Yokohama (JP)

(73) Assignee: Hitachi Solutions, Ltd., Tokyo (JP)

( * ) Notice: Subject to any disclaimer, the term of this patent is extended or adjusted under 35 U.S.C. 154(b) by 152 days.

(21) Appl. No.: 13/547,731

(22) Filed: Jul. 12, 2012

(65) Prior Publication Data

US 2013/0124503 A1 May 16, 2013

(30) Foreign Application Priority Data

Nov. 14, 2011 (JP) ................. 2011-248190

(51) Int. Cl.  
*G06F 17/30* (2006.01)

(52) U.S. Cl.  
CPC .................. *G06F 17/30091* (2013.01)

(58) Field of Classification Search  
CPC ............. G06F 17/30079; G06F 17/30091  
USPC ........................................ 707/610  
See application file for complete search history.

(56) References Cited

U.S. PATENT DOCUMENTS

| | | | |
|---|---|---|---|
| 2007/0016583 A1* | 1/2007 | Lempel et al. | 707/9 |
| 2008/0071805 A1 | 3/2008 | Mourra et al. | |
| 2010/0235383 A1* | 9/2010 | Kashiwase et al. | 707/769 |
| 2010/0242096 A1* | 9/2010 | Varadharajan et al. | 726/4 |
| 2011/0078112 A1* | 3/2011 | Takata et al. | 707/622 |

* cited by examiner

*Primary Examiner* — Jacob F Bétit  
*Assistant Examiner* — Kristopher Andersen  
(74) *Attorney, Agent, or Firm* — Foley & Lardner LLP

(57) ABSTRACT

A device relative to a delta indexing method for a hierarchy file storage including a from-end side file server and a back-end side file server is provided. The front-end side file server creates a file update list for accumulating a file update history in a file system therein, a search server requests the file update list to the front-end side file server, and the front-end side file server supplies path name information of a targeted file in the back-end side file server in addition to the file update list, thereby, the search accesses tot the back-end side file server to be able to acquire necessary information for a search index update.

5 Claims, 32 Drawing Sheets

FIG. 7

| KEYWORD | CORRESPONDING LOCATION INFORMATION | | | | | | |
|---|---|---|---|---|---|---|---|
| | FILE IDENTIFICATION INFORMATION | CORRESPONDING LOCATION OFFSET | WEIGHT | FILE IDENTIFICATION INFORMATION | CORRESPONDING LOCATION OFFSET | WEIGHT | ... |
| abc | f1 | 20,40 | 1.0,0.5 | f2 | 15 | 1.0 | ... |
| def | f2 | 40 | 0.5 | null | null | null | ... |
| hij | f1 | 100 | 0.8 | f3 | 40 | 1.0 | ... |
| ... | ... | ... | ... | ... | ... | ... | ... |

FIG. 8

| FILE IDENTIFICATION INFORMATION | FILE PATH NAME | METADATA |
|---|---|---|
| f1 | /dir1/file1 | m1 |
| f2 | /dir1/file2 | m2 |
| f3 | /dir2/file3 | m3 |
| ... | ... | ... |

FIG. 9

| OCCURRENCE DATE AND TIME | OPERATION CLASS | OBJECT CLASS | PATH NAME |
|---|---|---|---|
| 2011/04/15 10:00:00 | CREATE | FILE | /DirA/FileP |
| 2011/04/15 11:00:00 | UPDATE | FILE | /DirA/FileP |
| 2011/04/15 11:30:00 | DELETE | FILE | /DirB/FileX |

| OBJECT CLASS | PATH NAME | Tier 2 STORAGE LOCATION | MANAGEMENT STATE |
|---|---|---|---|
| DIRECTORY | / | TenantA/44 | REPLICATED |
| DIRECTORY | /DirA | TenantA/33 | REPLICATED |
| FILE | /DirA/FileP | TenantA/22 | MIGRATED |
| FILE | /FileQ | TenantA/55 | REPLICATED |
| FILE | /FileR | - | UNREPLICATED |

6410 / 6420 / 6430 / 6440

6400

DELTA INDEXING METHOD FOR HIERARCHY FILE STORAGE

INCORPORATION BY REFERENCE

The present application claims priority from Japanese application JP2011-248190 filed on Nov. 14, 2011, the content of which is hereby incorporated by reference into this application.

BACKGROUND OF THE INVENTION

The present invention relates to a control method in a search server and file server for providing functions of searching files stored in a hierarchy file storage system.

The application of computers has been spread widely in the various businesses and other fields in response to advancing high performance and low cost. In late years, the number of data tiles to be stored in a computer system has also been enormous. Particularly, for a purpose of managing a large number of files in low cost in an entirety system, the application of a hierarchy file storage system has been spread widely in such a way that files are moved suitably to an optimum file server, on the basis of a file management policy, by combining a high speed and high cost front-end file server with a low cost and large capacity back-end file server.

In the case of managing such large-capacity file, there has also raised a problem that a user cannot find out where a desired file is stored in. For this problem, a full-text search service has been used in these days. In the full-text search service, the search server analyzes the file data stored in the computer system to create a search index in advance. The user then transmits a search query to the search server, for searching the file to be acquired, to access a targeted file on the basis of a searched result. It is considered that the number of files to be stored in the computer system could be increased from now in such search service, and a difficulty could also be raised such that the user cannot identify all of file data for what sort of it and where it is stored in Therefore, the search service becomes significant for the user, and the use of this service could be spread widely.

In the past, in the case of realizing a file search service cooperating with the file server and search server, it has been required that the search server crawls the file server periodically to specify an updated target file when carrying out a search index update in the search server. In this crawling, it has required that an access is executed to all of the files stored in a target file server to refer a final update date and time of the file, update a previous index, and determine whether the file is updated. In such operation, the greater the number of target files, the larger the processing toad becomes. Particularly, another problem arises in the case of using the hierarchy file storage system as a file server. Specifically, due to the access processing to the all of files to specify the updated target file, the file stored in a back-end side file server in the hierarchy file storage system is read out once in a front-end file server to then access to the file by the search server. For this reason, a data traffic between the file servers becomes increased in the hierarchy file storage system.

A method of solving a problem in the search index update in the search server has been proposed as US-A-2008/0071805 disclosing that a file update list is created in the file server in advance and the search server then acquires and uses the list in the search index update. In this method, the file server becoming a search target detects a content of the file update in the file system to accumulate its information and manage the files. The search server acquires the file update list, therefore, it is not required to access to all of the files in the file servers when updating the search index, for specifying the updated target file. In this way, it is possible to execute the index update efficiently by using the file update list.

In the technique disclosed in US-A-2008/0071805, the data traffic between the networks is sometimes increased in the case where the search server acquires the file update list and updated target file from the front-end side file server. Particularly, a separate data transfer from the back-end side file server to the front-end side file server is required when an entity of the updated target file is stored in the back-end side file serve of the hierarchy file storage system.

Also in the technique disclosed in US-A-2008/0071805, a file path name cannot sometimes be specified in the front-end side file server of the updated target file in the case where the search server acquires the file update list and updated target file from the back-end side file server. Particularly, in the hierarchy file storage system, the path name of the front-end side file server is not required to store synchronously in the back-end file server when the file is replicated or moved from the front-end side file server, in the case where a name space to be used in the front-end side file server and back-end side file server is independent. In the case of storing the path name synchronously, a rename processing is required synchronously even in the back-end side file server in accordance with when the rename of a directory name etc. is carried out in the front-end side file server. For this reason, it is fully assumed that the path name is not stored synchronously in the case of considering performance requirements of the entirety system.

However, in the above-described case, there arises two following problems when the search server cannot acquire the path name in the front-end side file server of the updated target file in the case of carrying out the index update. First, the path name of front-end side file server cannot be contained in a searched result supplied by the search server. The user of the hierarchy file storage system therefore uses the path name of front-end side file server to carry out a file access. For this reason, the user received the searched result cannot identify an access destination of the file even though the user tries to access the file when the path name and searched result cannot be supplied. Second, it becomes difficult to acquire access control information set in a parent directory and an ancestor directory of the updated target file in carrying out the index update, when the front-end side file server uses NFS (Network File System) as a file-sharing protocol. This is because the access control information of the directory is also required for carrying out a qualification of the searched result on the basis of an access right set in a search request user and a search target file when the search server supplies the searched result. The search server requires path name information regarding the updated target file, for accessing to the directory.

SUMMARY OF THE INVENTION

As described above, a control technique is required for supplying the information regarding a storage location of the updated target file, for use in a device for carrying out the index update so that the index update based on the file update list is carried out efficiently in the hierarchy file storage system.

In order to solve the above-described problem and in an aspect of the invention, a device for acquiring data of files stored in either a first file storage device or a second file storage device comprises: means that requests a transmission of a file update list as a list of update files updated in a predetermined time period to the first file storage device; means that receives the file update list, from the first file storage device, containing location information of the update files in the first file storage device and the second file storage device and management state information of the update files; means that judges whether file data and metadata are acquired in accordance with the management state information contained in the file update list, as either the first file storage device or the second file storage device is set in an acquisition source, for the update files contained in the file update list; means that requests a transmission, to the acquisition source, of the file data and metadata in the update file present in a location indicated by the location information in the acquisition source; and means that receives the file data and metadata of the update file from the acquisition source.

According to the above described configuration, the index update based on the file update list can be carried out efficiently in the hierarchy file storage system.

The other objects, features and advantages of the invention will become apparent from the following description of the embodiments of the invention taken in conjunction with the accompanying drawings.

BRIEF DESCRIPTION OF THE DRAWINGS

FIG. 7 is a diagram showing a search index management table in the first embodiment;

FIG. 8 is a diagram showing a search index registration file management table in the first embodiment, FIG. 9 is a diagram showing a file update list management table in the first embodiment;

FIG. 10 is a diagram showing a file hierarchy management table (collective management) in the first embodiment;

DESCRIPTION OF THE EMBODIMENTS (Embodiment 1)

A description in a first embodiment will be concerned with a file update list management method in a hierarchy file storage and a delta indexing method for files stored in the hierarchy file storage in a search server. This embodiment targets mainly the case where a creation of the file update list in the hierarchy file storage is carried out by a Tier 1 file server and an access to an updated target file from the search server is carried out for a Tier 2 file server.

Figure 1:
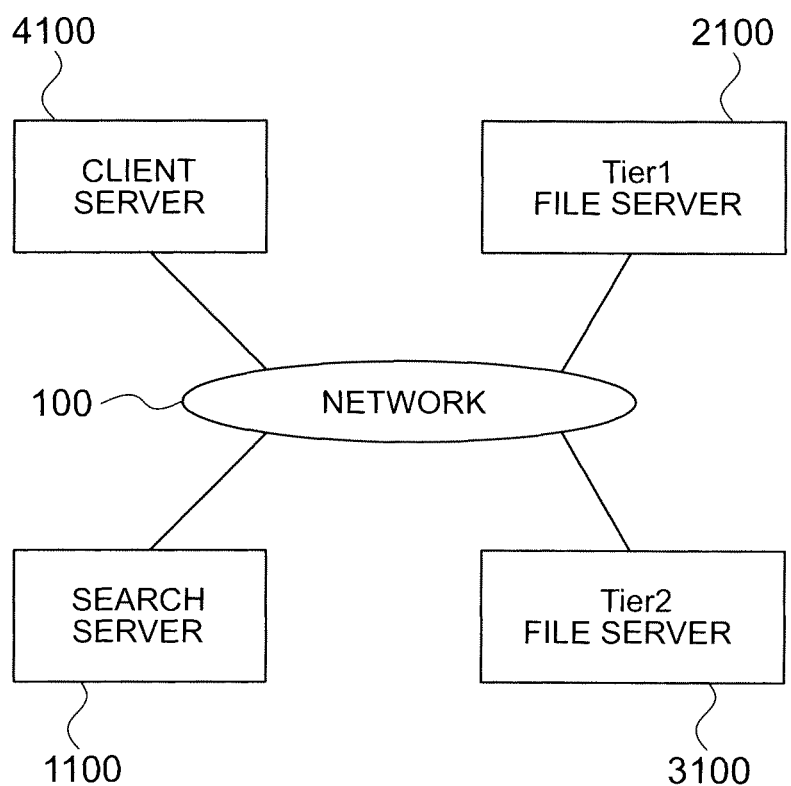
FIG. 1 is a diagram showing a configuration of a system for carrying out a delta indexing method for hierarchy file storage.

FIG. 1 is a diagram showing a system configuration the embodiment. A search server 1100, a Tier 1 file server 2100, a Tier 2 file server 3100 and a client machine 4100 are coupled with each other via a network 100. In this system. the search server 1100 supplies a file search service for files stored in the hierarchy file storage made up of the Tier 1 file server 2100 and Tier 2 file server 3100. The Tier 1 file server 2100 corresponds to a front-end side file server of the hierarchy file storage and accepts a file access request from a user to supply a file-sharing service. The Tier 2 file server 3100 corresponds to a back-end side file server of the hierarchy file storage, and stores and manages a part of stored files in the hierarchy file storage on the basis of a request from the Tier 1 file server 2100. Basically, the Tier 2 file server 3100 does not accept the file access request from the user. In the case of accessing to the files stored in the Tier 2 file server 3100, the access is carried out via the Tier 1 file server 2100. The client machine 4100 can carry out a search request to the search server 1100 from the user, as well as the file access request to the Tier 1 file server 2100. By using this system, the user can carry out a file search with use of the search server, for the files stored in the hierarchy file storage.

In addition, FIG. 1 illustrates a single element for each of the configurations. which is however not limited thereto. A plural number of the configuration elements may also be acceptable. FIG. 1 also illustrates that the each of the configuration elements is separated, which is not limited thereto. A single element may also be configured by arbitrary two or more elements. The connection configuration for the network 100 may be acceptable as any types, for example, Internet and Intranet connection configured by LAN may also be acceptable.

Figure 2:
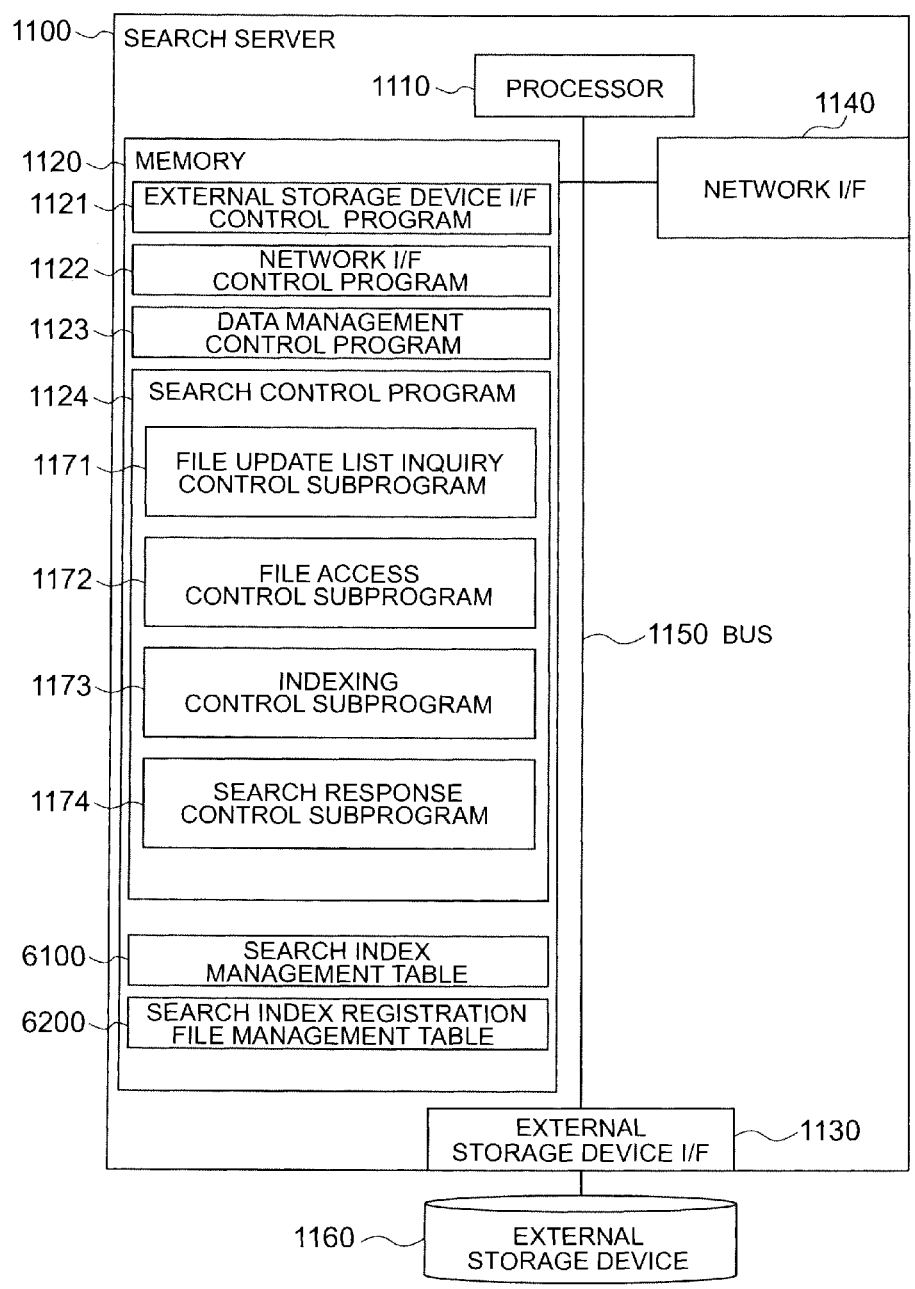
FIG. 2 is a diagram showing a configuration of a search server.

FIG. 2 is a diagram showing a hardware configuration of search server 1100. The search server 1100 is configured by a processor 1110 for executing programs, a memory 1120 for temporarily storing the programs and data, an external storage device I/F 1130 for accessing to an external storage device 1160, a network I/F 1140 for accessing to other devices coupled with the network, and a bus 1150 for coupling with the above described elements. The memory 1120 stores an external storage device I/F control program 1121 for controlling the external storage device I/F 1130, a network control program 1122 for controlling the network I/F 1140, a data management control program 1123 for supplying a file system or a database to be used for managing stored data in the search server 1100, a search control program 1124 for supplying an indexing and a search service in the search server 1100, and a search index management table 6100 and a search index registration file management table 6200 to be used by the search control program 1124.

The search control program 1124 has a file update list inquiry control subprogram 1171, a file access control subprogram 117 an indexing control subprogram 1173 and a search response control subprogram 1174. The file update list inquiry control subprogram 1171 carries out a processing for inquiring file update information in the file server, for the file server for storing a search target file. The file update information corresponds to a file update list created on the basis of an access log etc of the file in the file server. When the file update list is not created in the file server, the search server 1100 crawls the files stored in the file server to carry out a previous indexing update to then specify a newly created file, an updated file and a deleted file. This collected information also corresponds to the file update list. In this invention, the case where the file update list to be created in the former file server is used is mainly assumed. The file access control subprogram 1172 carries out a processing for acquiring data and metadata of the file stored in the file server by the search server 1100. Specifically, the processing is carried out for acquiring the data and metadata for use in an index update of a targeted file, for the files written in the file update list acquired by the file update list inquiry control subprogram 1171 The indexing control subprogram 1173 analyzes the data and metadata of an updated target file to then carry out a processing for reflecting on an index managed for the search service by the search server 1100. Specifically, the indexing control subprogram 1173 analyzes the data and metadata of the updated target file acquired by the file access control subprogram 1172 to reflect on the search index management table 6100 and search index registration file management table 6200 to be managed by the search server 1100. The search response control subprogram 1174 accepts a search request from the user to carry out a processing for creating and supplying a searched result by using the search index management table 6100 and search index registration file management table 6200 in the own self search server.

In addition, the search index management table 6100 and search index registration file management table 6200 will be described later.

Figure 3:
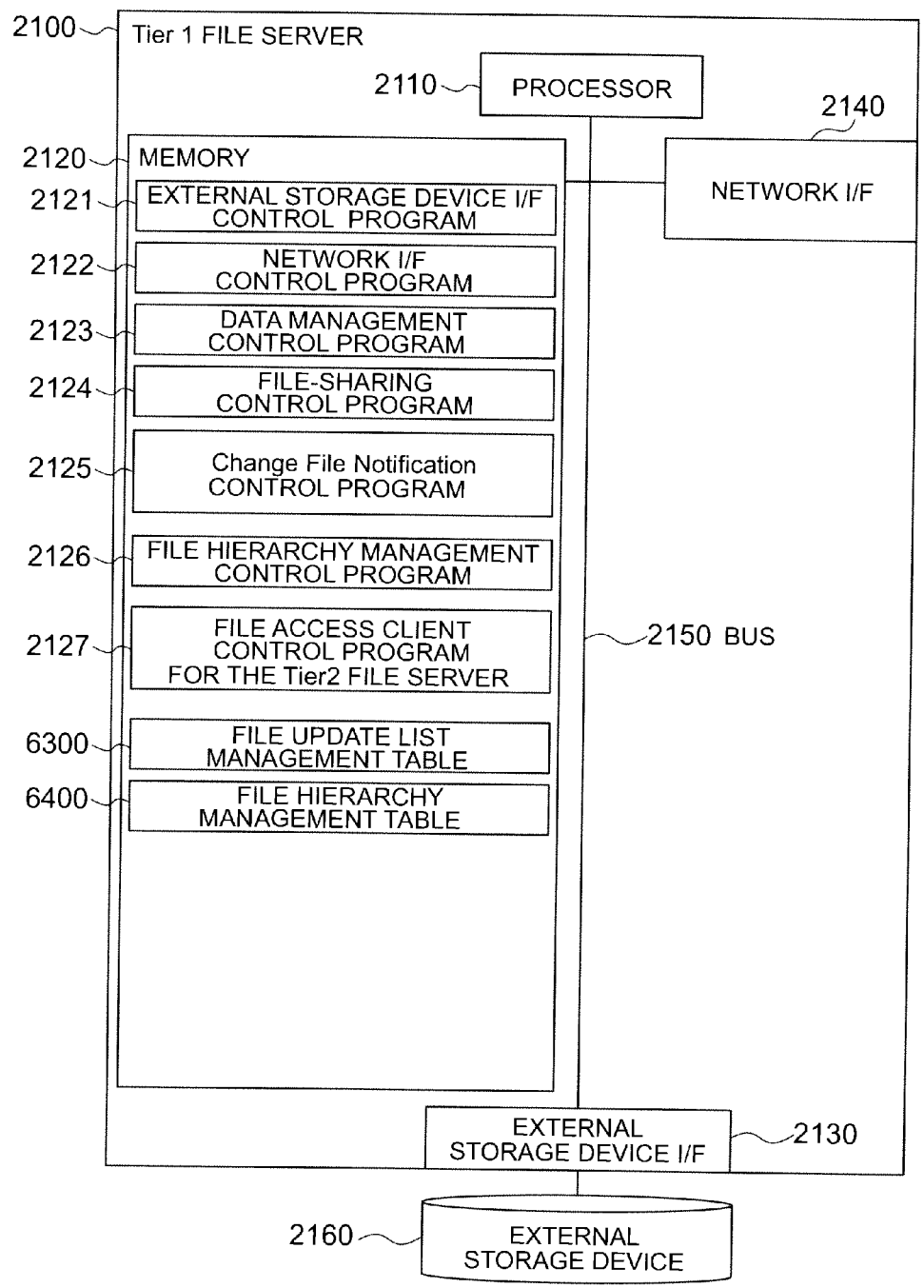
FIG. 3 is a diagram showing a configuration of a Tier 1 file server.

FIG. 3 is a diagram showing a hardware configuration of Tier 1 file server 2100. The Tier 1 file server 2100 is configured by a processor 2110 for executing programs, a memory 2120 for temporarily storing the programs and data, an external storage device I/F 2130 for accessing to an external storage device 2160, a network 2140 for accessing to the other devices coupled with the network, and a bus 2150 for coupling with the above described elements. The memory 2120 stores an external storage device I/F control program 2121 for controlling the external storage device I/F 2130, a network I/F control program 2122 for controlling the network I/F 2140, a data management control program 2123 for supplying the file system or database to be used for managing the stored data in the Tier 1 file server 2100, a file-sharing control program 2124 for storing the files in the Tier 1 file server 2100 and supplying a file-sharing service for sharing between the plural users, a change file notification control program 2125, a file hierarchy management control program 2126, a Tier 2 file server-file access client control program 2127, a file update list management table 6300 to be used by the change file notification control program 2125, and a file hierarchy management table 6400 to be used by the file hierarchy management control program 2126.

The change file notification control program 2125 stores and manages event information of occurring an addition, update or deletion for files and records in the data management control program 2123 on the basis of update information of the files and records managed by the data management control program 2123 in the Tier 1 file server 2100. The file hierarchy management control program 2126 carries out a processing required for realizing the hierarchy file storage by using the Tier 1 file server 2100 and Tier 2 file server 3100. The Tier 2 file server-file access client control program 2127 supplies a necessary function when the file hierarchy management control program 2126 carries out a file access operation to the Tier 2 file server 3100.

In addition, the file update list management table 6300 and file hierarchy management table 6300 will be described later.

Figure 4:
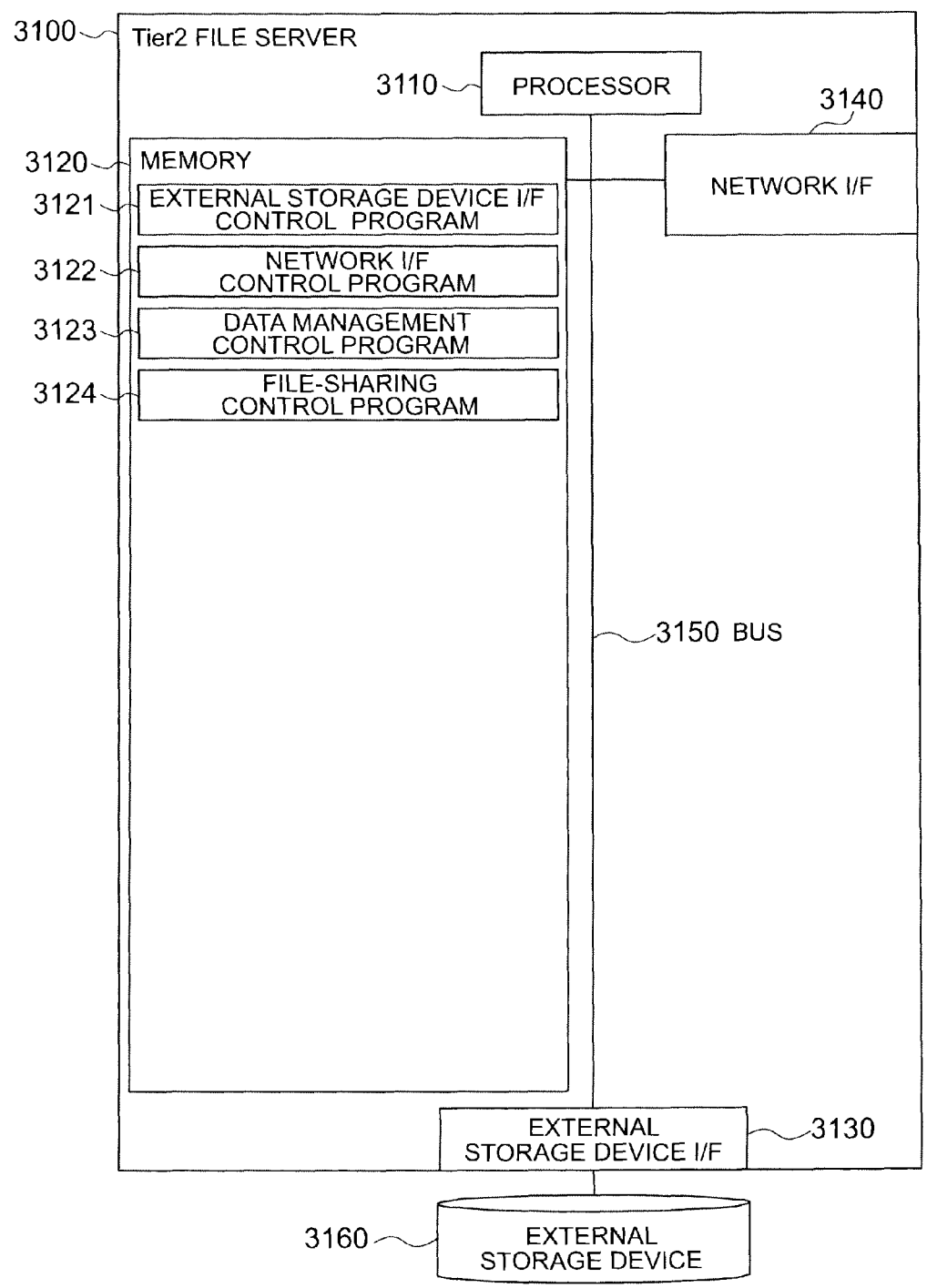
FIG. 4 is a diagram showing a configuration of a Tier 2 file server.

FIG. 4 is a diagram showing the hardware configuration of Tier 2 file server 3100. The Tier 2 file server 3100 is configured by a processor 3110 for executing programs, a memory 3120 for temporarily storing the programs and data, an external storage device I/F 3130 for accessing to an external storage device 3160, a network I/F 3140 for accessing to the other devices coupled with the network, and a bus 3150 for coupling with the above described elements. The memory 3120 stores an external storage device control program 3121 for controlling the external storage device I/F 3130, a network I/F control program 3122 for controlling the network I/F 3140, a data management control program 3123 for supplying the file system or database to be used for managing the stored data in the Tier 2 file server 3100, and a file-sharing control program 3124 for storing the files in the Tier 2 file server 3100 and supplying the file-sharing service for sharing between the plural users.

In this embodiment, a client of the file-sharing service supplied by the file-sharing control program 3124 becomes the Tier 1 file server 2100 configuring the hierarchy file storage system. Basically, the Tier 2 file server 3100 is operated so as not to be accessed directly to the file from the user.

Figure 5:
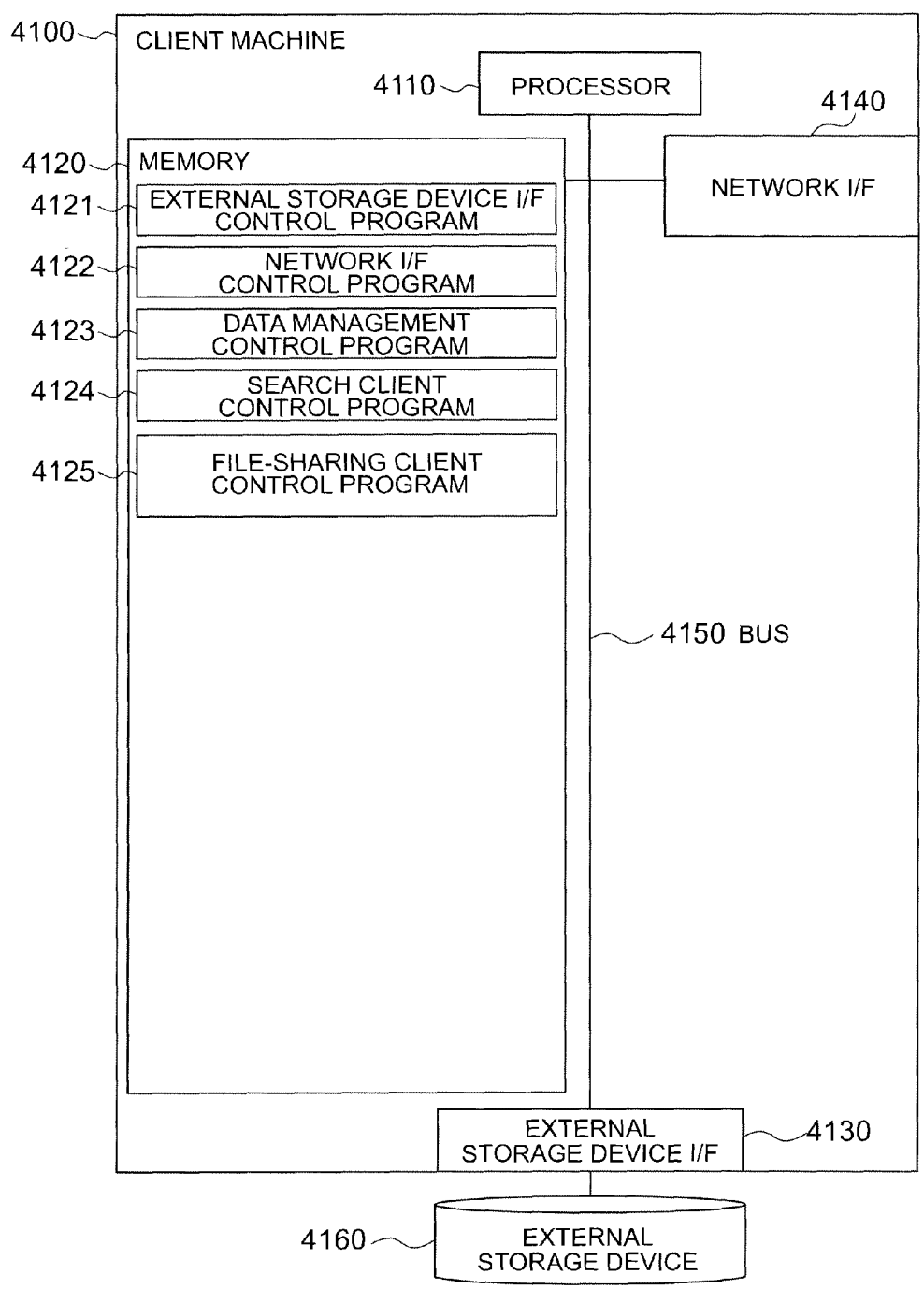
FIG. 5 is a diagram showing a configuration of a client machine.

FIG. 5 is a diagram showing the hardware configuration of client machine 4100. The client machine 4100 is configured by a processor 4110 for executing programs, a memory 4120 for temporarily storing the programs and data, an external storage device I/F 4130 for accessing to an external storage device 4160, a network I/F 4140 for accessing to the other devices coupled with the network, and a bus 4150 for coupling with the above described elements. The memory 4120 stores an external storage device I/F control program 4121 for controlling the external storage device I/F 4130, a network OF control program 4122 for controlling the network I/F 4140, a data management control program 4123 for supplying the file system or database to be used for managing the stored data in the client machine 4100, a search client control program 4124 to be used for accessing to the search server 1100 from the client machine 4100, and a file-sharing client control program 4125 to be used for accessing to the file shared and stored into the hierarchy file storage from the client machine 4100.

In addition, the search client control program 4124 corresponds to a client program supplied by the search serve 1100 to be used or a program for supplying a function ire accordance with a specification supplied by the search server. For example, the search client control program 4124 may be of a configuration using a Web application program used for the search server and may also be of a configuration using a general-purpose Web browser.

Figure 6:
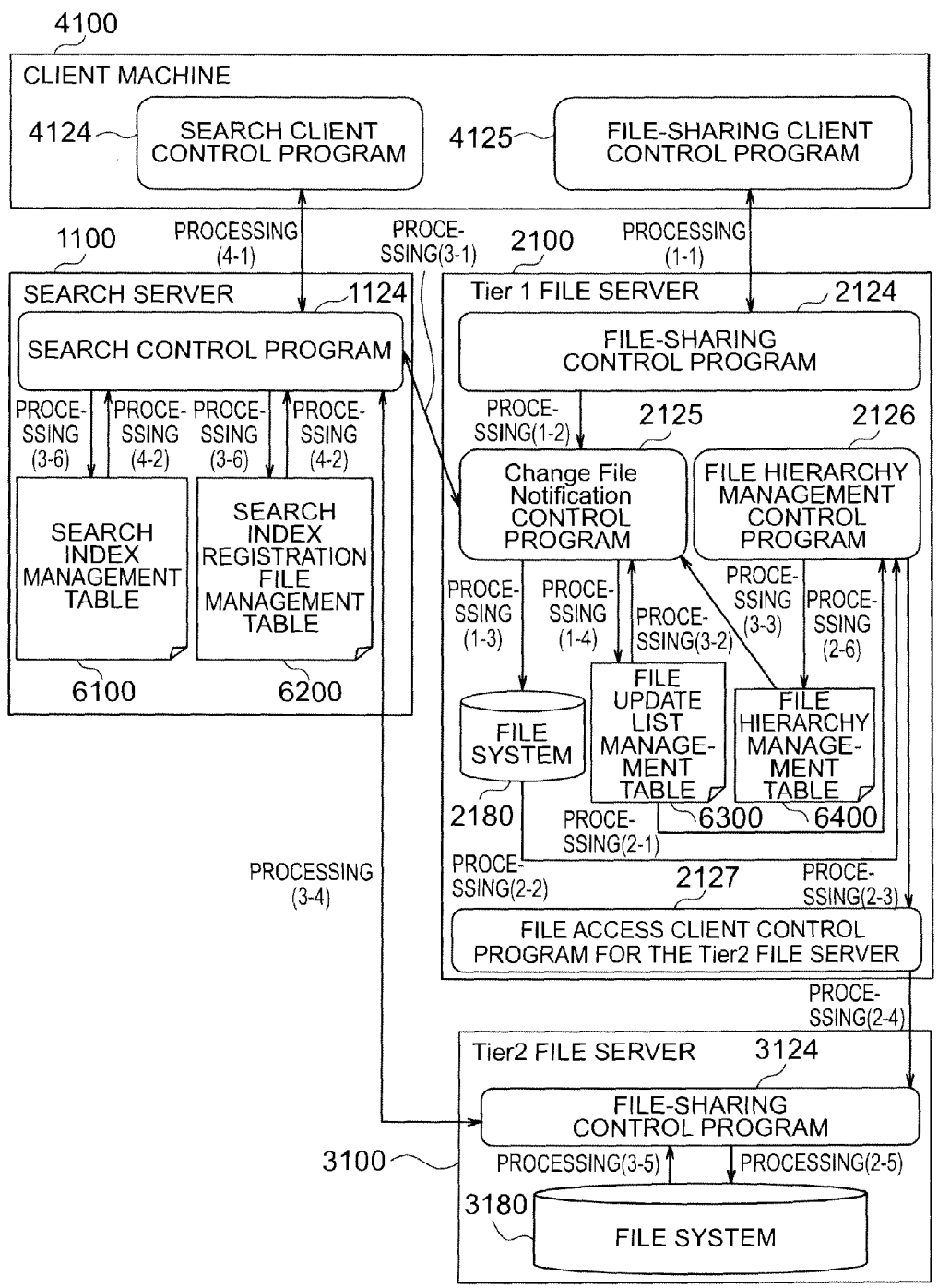
FIG. 6 is a diagram showing an entire processing sequence of an index update processing and a search processing for a hierarchy file storage in a first embodiment.

FIG. 6 is a diagram showing a processing sequence operated in such that the user registers a file in the hierarchy file storage from the client machine 4100, and the search server 2100 indexes the registered file to supply a searched result for the search request requested from the user, by using the indexed data, through the search server 2100. Here, a description will be concerned with four processing cases: a file registration processing as a processing (1) for the Tier 1 file server 2100 from the client machine 4100, a file replication and move processing as a processing (2) for the Tier 2 file server 3100 from the Tier 1 file server 2100, an index update processing as a processing (3) for the files in the hierarchy file storage from the search server 1100, and a file search processing as a processing (4) for the search server 1100 from the client machine 4100.

The processing (1) will be described first, The user uses the file-sharing client control program 4125 in the client machine 4100 to output a file storing request to the Tier 1 file server 2100 at a processing (1-1), The file-sharing control program 2124 in the Tier 1 file server 2100 outputs a request to the data management control program 2123 so that a targeted file is stored in a file system 2180. In this case, a notification of the file registration is also output to the change file notification control program 2125 at a processing (1-2) The data management control program 2123 stores the targeted file in the file system 2180 at a processing (1-3). The change file notification control program 2125 registers file registration event information in the file update list management table 6300 at a processing (1-4). The above-described processing corresponds to the file registration processing.

The processing (2) will be described next. The file hierarchy management control program 2126 in the Tier 1 file server 2100 checks information registered in the file update list 6300 to then check whether a candidate file to be replicated or moved to the Tier 2 file server 3100 is present at a processing (2-1). If the candidate file is present, the file hierarchy management control program 2126 reads out the targeted file from the file system 2180 at a processing (2-2) The file hierarchy management control program 2126 then requests so as to read the file in the Tier 1 file server and store this in the Tier 2 file server 3100, file access client control program for the Tier 2 file server 2127 at a processing (2-3). The file access client control program for the Tier 2 file server 2127 outputs the storing request of the targeted file to the Tier 2 file server 3100 at a processing (2-4). The file-sharing control program 3124 in the Tier 2 file server 3100 outputs a request to the data management control program 3123 so that the targeted file is stored in a file system 3180, and the targeted file is then stored at a processing (2-5). If the file store is succeeded on the Tier 2 file server 3100, the file hierarchy management control program 2126 registers storage location information (a file path name etc, in the Tier 2 file storage 3100) of the targeted tile and state information (unreplicated, replicated or moved, etc,) regarding the hierarchy management at a processing (2-6). Here, the file hierarchy management control program 2126 is required such that the targeted file stored in the file system 2180 is stubbed, when the targeted file is set in a move state. Specifically, data in the targeted file is deleted, metadata is only remained therein, and link information to the file stored in the Tier 2 file server 3100 is added to and stored in the targeted file. The above-described processing corresponds to the file replication and move processing between the Tier file servers.

The processing (3) will be described below. The search control program 1124 in the search server 1100 carries out a file update list inquiry for the Tier 1 file server 2100 at a processing (3-1). Specifically, in the search server 1100, the previous index update is carried out to then inquire information for which of the files is newly added, updated or deleted in the hierarchy file storage. The change file notification control program 2125 in the Tier 1 file server 2100 checks the file update list 6300 to check whether the file is present, and the files are listed, at a processing (3-2). The change file notification control program 2125 checks the file hierarchy management table 6400 for the listed files to check, whether the targeted file can be accessed by which of the path names in the Tier 2 file server 3100, to then be merged in the listed files and supply to a request source, at a processing (3-3). This list becomes an updated target file list. The search control program 1124 in the search server 1100 requests a read-out of the targeted file to the Tier 2 file server 3100, on the basis of the received updated target file list, at a processing (3-4). The file-sharing control program 3124 in the Tier 2 file server 3100 acquires the file requested as read-out from the file system 3180 to supply to the request source at a processing (3-5). The search control program 1124 acquired the updated target file analyzes a content of the targeted file to reflect an analyzed result on the search index management table 6100 and search index registration file management table 6200 at a processing (3-6). The above-described processing corresponds to the search index update processing carried out by the search server 1100.

Finally, the processing (4) will be described below. The user uses the search client control program 4124 in the client machine 4100 to output a file search request to the search server 1100 at a processing (4-1). The search control program 1124 in the search server 1100 uses the search index management table 6100 and search index registration file management table 6200 to extract a file coincident with a designated condition, collect up a searched result, and supply to the request source, at a processing (4-2). The above-described processing corresponds to the file search processing.

FIG. 7 is a diagram showing the configuration of search index management table 6100 to be managed in the search server 1100 The search index management table 6100 manages information of a search index created by the search server 1100 Specifically, the search index management table 6100 is configured by information, such as a keyword 6110, corresponding location information 6120, etc.

The keyword 6110 stores a character string acquired by analyzing the targeted file in an indexing processing. The location information 6120 registers information of the file in which the character string of keyword 6110 is present. The location information 6120 is configured by elements, such as file identification information 6121, 6124, a corresponding location offset 6122, 6125 and a weight 6123, 6126. The file identification information 6121, 6124 registers information for identifying the file in which the character string of keyword is emerged. Specifically, both the location information 6120 and file identification information 6121, 6124 may register information registered in a column of the file identification information 6210 in the after-described search index registration file management table 6200, and may also be a file path name or a file identifier in accessing actually to the targeted file. The corresponding location offset 6122, 6125 registers offset information in which the character string of keyword is emerged, in the file. In this column, plural pieces of offset information are registered, when the keyword is emerged at plural locations in one file. The weight 6123, 6126 registers a value of an important degree dependent on emerging the character string of keyword in the offset of file. The value of important degree is set appropriately by the search server 1100. This value is set as meaning that the larger the importance is given. This value is also set as usable in qualifying and aligning the searched result. Here, the location information 6120 enables to register the plural pieces of information for one keyword 6110. In this way, it can be useful to correspond to the case where the keyword character string is present in plural numbers. In addition, the column in the location information 6120 can also register a null value meaning that the value of corresponding entry is invalid. This can be used for the entry, the item of which becomes empty, when the number of registration is less than the other entry in the column of location information 6120.

FIG. 8 is a diagram showing the configuration of search index registration file management table 6200 to be managed in the search server 1100. The search index registration file management table 6200 manages information regarding the file acquired from the file share in the hierarchy file storage to be targeted for creating the search index by the search server 1100. Specifically, the search index registration file management table 6200 is made up of configuration elements, such as file identification information 6210, a file path name 6220 and metadata 6230.

Here, the file identification information 6210 is an identifier or uniquely identifying the file so that the search server 100 creates the search index. It may be a serial number given by the search server 1100 and also be a serial number given by the hierarchy file storage storing the file. In addition, the character string usable to the identification may also be used for the file identification information 6210, other than the serial number. The file path name 6220 corresponds to a file path name stored in the targeted file. In this way, the search server 1100 can acquire the file by designating the file path name 6220 and supplying a file acquisition request. The metadata 6230 stores the metadata acquired in indexing the targeted file. By using the search index registration file 6200, a determination of whether the keyword is coincident to the other may only be used with the search index management table 6100, when the search control program 1124 responds to the search request for a keyword designation from the user. Information required for accessing to the targeted file, only coincident with a condition of the file, can be acquired appropriately from the search index registration management table 6200.

FIG. 9 is a diagram showing the configuration of file update list management table 6300 to be managed in the Tier 1 file server 2100. The file update list management table 6300 records and manages event information of a newly created file by requesting from the user, of an updated file, and of a deleted tile in the Tier 1 file storage 2100. Specifically, the file update list management table 6300 is made up of configuration elements, such as an occurrence date and time 6310, an operation class 6320, an object class 6330 and a path name 6340.

Here, the occurrence date and time 6310 stores information regarding a date and time of occurring the event regarding the creation, update and deletion. The operation class 6320 stores information regarding the class of the event, specifically, it registers the class, such as the creation, update and deletion. In addition, information specifying a target raising the update may also be added as an update to the operation class 6320. For example, the column of operation class 6320 may register both a data update and a metadata update, as a class, in the case of dividing the class into these data. The object class 6330 stores information regarding the class for dividing the target raised the event. Specifically, it registers the class, such as a file and a directory in the case of using the file system. It registers the class, such as a record, a column and a tuple in the case of using the database. Finally, the path name 6340 stores information required for accessing to an object raised the event. Specifically, it may store information, such as the path name and an i-node number of the targeted file in the case of using the file system. It may also store information, such as an identification record number of a targeted record in the case of using the database.

FIG. 10 is a diagram showing the configuration of file hierarchy management table 6400 to be managed in the Tier 1 file server 2100. The file hierarchy management table 6400 manages collectively for associating with an identifier of the file in the Tier 1 file server 2100 and an identifier of the file in the Tier 2 file server 3100, in the case of replicating or moving a part of the files stored in the Tier 1 file server 2100 to the Tier 2 file server 3100 by the file hierarchy management control program 2126. Specifically, the file hierarchy management able 6400 is made up of configuration elements, such as an object class 6410, a path name 6420, a Tier 2 storage location 6430 and a management state 6440.

Here, the object class 6410 stores information regarding the class for dividing the replicated or moved target. Specifically, it registers the class, such as the file and directory in the case of using the file system. The path name 6420 stores the identifier of the Tier 1 file server 2100 regarding the replicated or moved target. Specifically, it stores the targeted file and the path name in the Tier 1 file server 2100 of the directory. The Tier 2 storage location 6430 stores the identifier in the Tier 2 file server 3100 regarding the replicated or moved target. Specifically, it stores the targeted file and the path name in the Tier 2 file server 3100 of the directory. In addition, the file hierarchy management table 6400 may also register an entry regarding the file and directory at a time when the file and directory are not replicated or moved. In the above-described cases, the column of Tier 2 storage location 6430 is made so as to register a value indicating that corresponding information is not present. Finally, the management state 6440 stores the state information indicating whether the targeted file and directory are replicated in the hierarchy file storage and whether they are moved to the Tier 2 file server 3100. Specifically, the information of file and directory is assumed as a state indicating that it is present in both the Tier 1 file server 2100 and Tier 2 file server 3100, in the case of registering as "replicated". In the case of registering as "migrated", the information of file and directory is present in the Tier 2 file server 3100 and assumed as a state indicating that a stub file is only present in the Tier 1 file server 2100. In the case of registering as "unreplicated", the information is assumed as a state indicating that it is present only in the Tier 1 file serve 2100 since the replication and move are not executed.

In addition, the information managed by the file hierarchy management table 6400 may be managed collectively for every file server as described here, and may also be managed individually as metadata for the files. The latter method will be described separately later.

Figure 11:
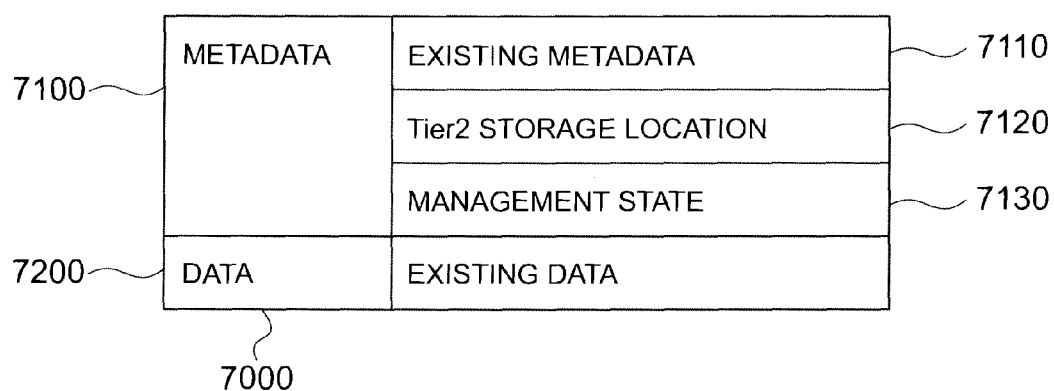
FIG. 11 is a diagram showing a file hierarchy management table (management as metadata of files) in the first embodiment.

FIG. 11 is a diagram showing the configuration for the case where the file hierarchy management table 6400 illustrated in FIG. 10 is managed as the metadata of the files. Here, it is based on the premise that a file 7000 becoming a hierarchy management target is managed by the file system in the Tier 1 file server 2100. This file 7000 is divided into metadata 7100 and data 7200 to be managed individually as shown in FIG. 11.

The metadata 7100 corresponds to management information appended to the file 7000 and is made up of configuration elements, such as existing metadata 7100, a Tier 2 storage location 7120 and a management state 7130. Here, the existing metadata 7110 stores the metadata having managed until now by the file system. Specifically, the existing metadata 7110 corresponds to a file holder and a final update date and time, access control information, tag information for identification, etc. The Tier 2 storage location 7120 and management state 7130 indicate the information identical to that in the Tier 2 storage location 6430 and management state 6440 illustrated in the file hierarchy management table 6400. In contrast, the data 7200 stores and manages the entity of digital data managed by the file 7000. This is identical to the existing data having been handled by the file system. In addition, the file 7000 has been described here as an example, but the information of directory can also be managed.

In the case of managing the information regarding a file hierarchy management not for the collectively formed management table but for the metadata of the respective files, the file and metadata of the directory may be checked for determining whether the targeted file and directory are replicated or moved to the Tier 2 file server 3100. This method is not required to have a newly separated management table if the metadata of the file system is expandable, which can be said that this is an easily realized system. In the case where it is required to identify whether which of the file and directory are replicated or moved to the Tier 2 file server 3100, it is required that the file system in the Tier 1 file server 2100 is crawled all to then check whether which of the file and directory are replicated or moved successively, In this case, it is possible to carry out the processing efficiently having rather the collectively formed management table.

Figure 12:
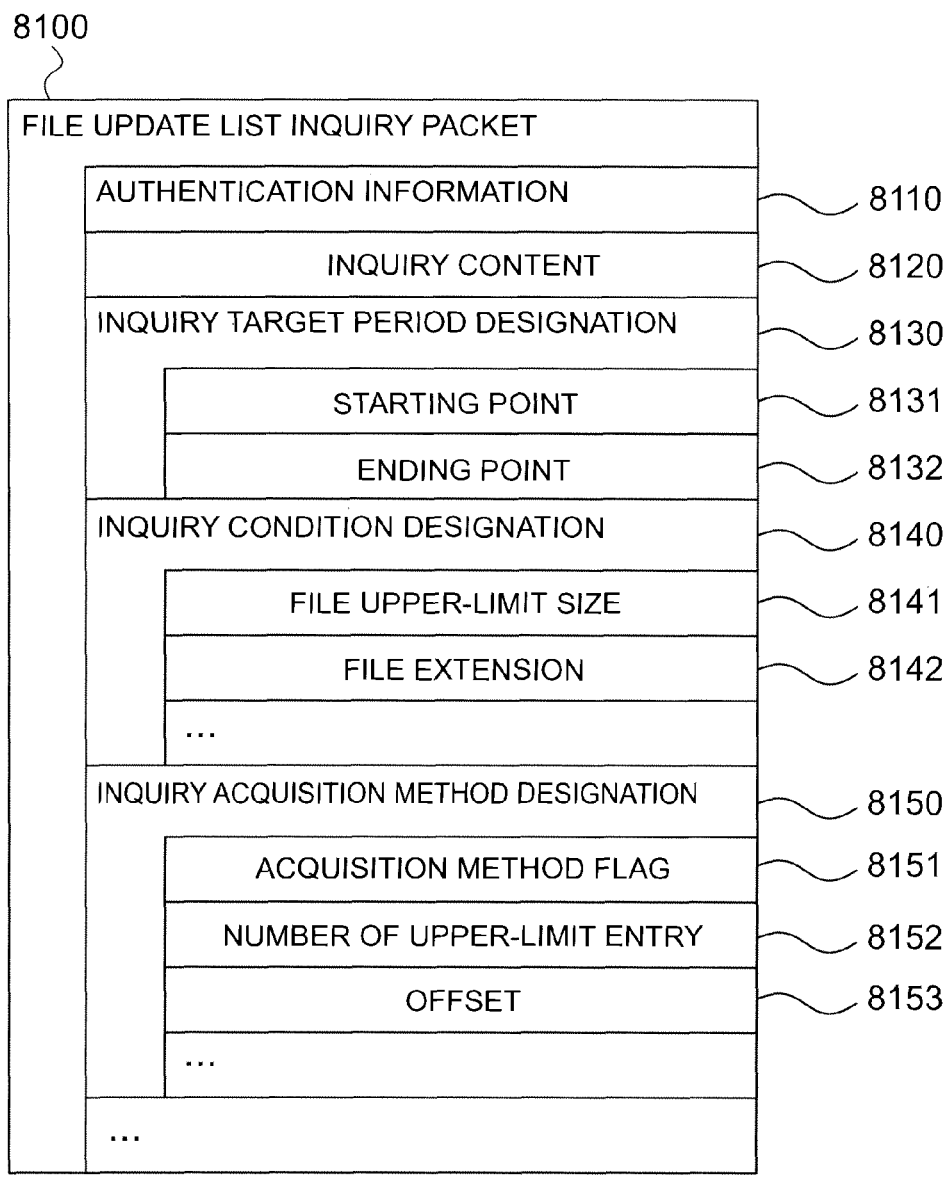
FIG. 12 is a diagram showing a data structure of a file update list inquiry packet in embodiment.

FIG. 12 is a diagram showing a data configuration of a file update list inquiry packet 8100 for notifying an inquiry content to the change file notification control program 2125 when inquiring the file update list to the change file notification control program 2125 in the Tier 1 file server 2100 from the search control program 1124 in the search server 1100 The file update list inquiry packet 8100 is configured by authentication information 8110, an inquiry content 8120, an inquiry target period designation 8130, an inquiry condition designation 8140 and an inquiry acquisition method designation 8150.

The authentication information 8110 stores information for identifying an inquiry request side and indicating a right demander. For example, it may store a combination of a user name and a password, and may also store like a digital certificate. The inquiry content 8120 stores information for identifying a task content to be requested by this inquiry. For example, it stores an acquisition request of all of data coincident with a designation condition, an acquisition request of the number of items coincident with the designation condition, etc.

The inquiry target period designation 8130 designates a period of time indicating a search target range for the inquiry. The file created, updated or deleted for the period of time designated by the inquiry target period designation 8130 becomes a search target designated by the inquiry. The inquiry target period designation 8130 has two columns: a starting point 8131 and an ending point 8132, and either or both of the points can be designated. The search is carried out for the all periods of time in the case of designating neither the starting point 8131 nor the ending point 8132.

The inquiry condition designation 8140 designates a characteristic of the file becoming the search target range in response to the inquiry. For example, it can designate an attribute, such as a file upper-limit size 8141 and a file extension 8142. The file upper-limit size 8141 can designate a maximum size of the search target file, and the file extension 8142 can designate an extension of the search target file. This column can be made to carry out a method of collectively designating a plurality of extensions, and can also be made to carry out the designation using a regular expression etc. From the above designation, when the condition of indexable file is determined previously in the search server side, it is possible to eliminate a useless processing by filtering the file having an unsatisfied condition in advance.

The inquiry acquisition method designation 8150 is used for designating what a format of a result acquired from the inquiry is supplied by the request source. Here, it can be made so as to designate the attribute, such as an acquisition method flag 8151, a number of upper-limit entry 8152 and an offset 8153. The acquisition method flag 8151 designates an acquisition method of the result. For example, it may designate so as to collectively acquire all of items and may also designate so as to acquire partly. In the latter case, it is also required to designate after-described the number of upper-limit entry 8152 and offset 8153. In the number of upper-limit entry 8152, it can be made so as to designate the number of items acceptable by the request source in response to the inquiry. In the offset 8153, it can be made so as to designate an acquisition of result from what number of entry in response to the inquiry, when the request source receives the result.

Figure 13:
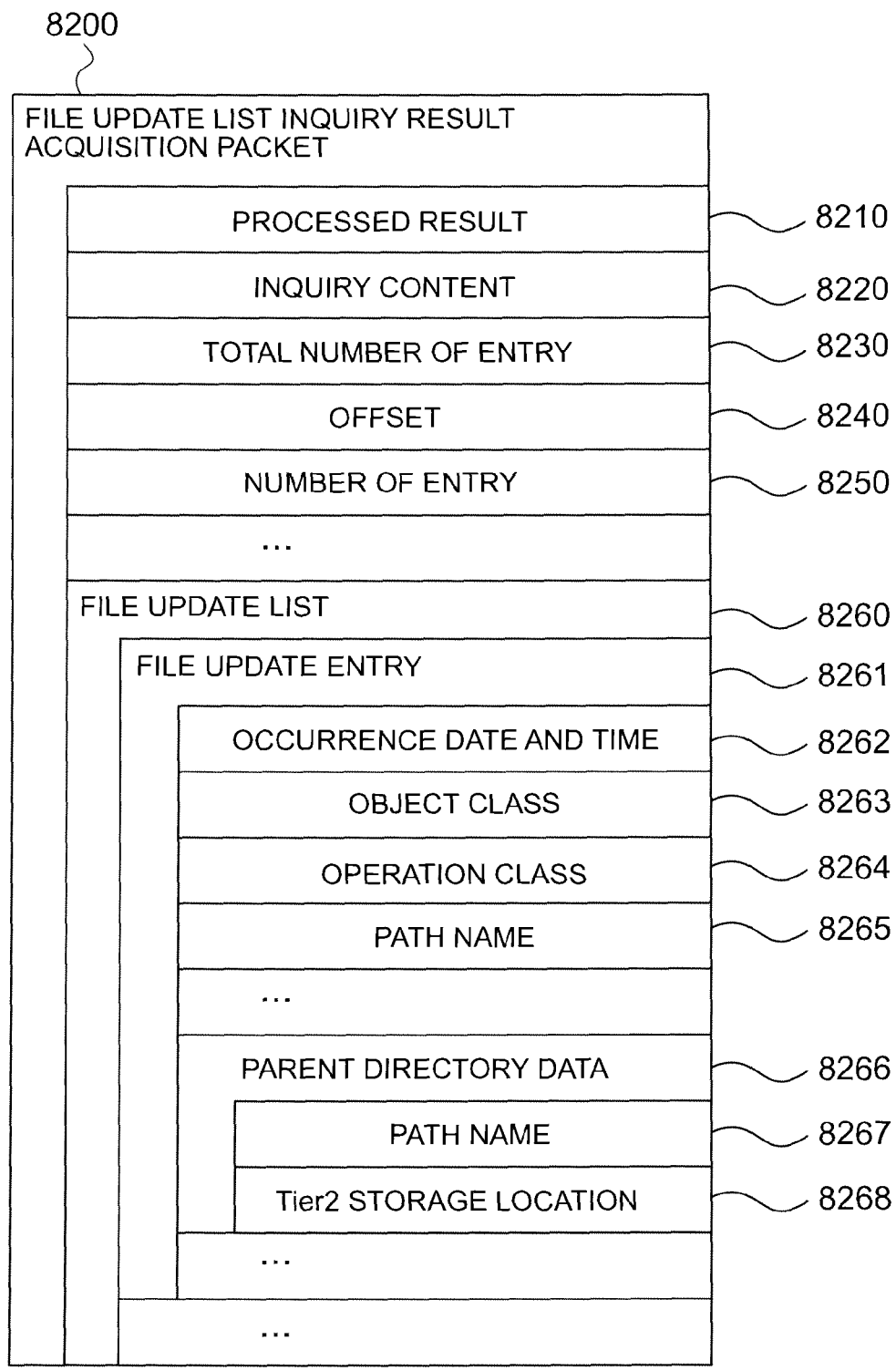
FIG. 13 is a diagram showing a data structure of a file update list inquiry result acquisition packet in a first embodiment in the first embodiment.

FIG. 13 is a diagram showing a data structure of a file update list inquiry result acquisition packet 8200 for notifying the result to the search control program 1124 in the search server 1100 from the change file notification control program 2125 in the Tier 1 file server 2100 when carrying out the inquiry in the above-described file update list inquiry packet 8100. The file update list inquiry result acquisition packet 8200 has a processed result 8210, an inquiry content 8220, a total number of entry 8230, an offset 8240, a number of entry 8250 and an update file list 8260.

The processed result 8210 stores information indicating a processed result in response to the inquiry. For example, it stores information indicating that the processing is terminated normally, information indicating that the processing is terminated in a middle caused by error, information indicating that the authentication is failed to therefore terminate the processing, etc. The inquiry content 8220 stores a content identical to that of the inquiry content 8120 in the file update list inquiry packet 8100 corresponding to the file update list inquiry result acquisition packet 8200. The total number of entry 8230 stores information indicating the number of items for all of the entries corresponding to the condition in response to the inquiry. The offset 8240 stores a content identical to that of the offset 8153 in the file update list inquiry packet 8100 corresponding to the file update list inquiry result acquisition packet 8200 A default value is used if the offset 8153 is not designated. The number of entry 8250 stores a content indicating number of a file update entry 8261 contained in the file update list 8260 in the file update list inquiry result acquisition packet 8200. By using the number of entry 8250. it is possible to identify how many items of file update entry 8261 are stored in the packet.

The file update list 8260 stores the file update entry 8261 indicating a number equal to or greater than 0. The tile update entry 8261 has an occurrence date and time 8262, an object class 8263, an operation class 8264, a path name 8265, and a parent directory data 8266 indicating a number equal to or greater than 0. The occurrence date and time 8262, object class 8263 and operation class 8264 respectively store the contents identical to those of the occurrence date and time 6310, object class 6330 and operation class 6320 in the above-described file update list management table 6300. The path name 8265 stores a content regarding the path name 6420 and Tier 2 storage location 6430 in the above-described file hierarchy management table 6400. In addition, the information to be stored may be an identical format to the information stored in the file update list management table 6300 and file hierarchy management table 6400, and the format may be partly transformed to that easily processed in a received side etc.

The parent directory 8266 stores information regarding the parent directory when the file and directory determined as an index update target are managed by the file system in the Tier 1 file server 2100. For example, the information contains a path name 8267 of the parent directory and a Tier 2 storage location 8268 for that directory. The path name 8267 stores a path name etc in the Tier 1 file server 2100 for the parent directory. The Tier 2 storage location 8268 stores the path name in the Tier 2 file server 3100 when the parent directory is replicated or moved to the Tier 2 file server 3100 Here, the parent directory 8266 has the entry for the number of stages of the directories from the directory having the tile and directory determined as the index update target up to a root directory in the file system and file share.

By using the parent directory data, since the collection of access control information set in the directory becomes easy and a qualification of the searched result based on an access right in the search request from the user becomes possible, a contribution to security can be Unproved. Specifically, it is required that access control information such as ACL (Access Control List) for the updated target file and directory is acquired separately since the qualification for the searched result is checked on the basis of the access right of search user when using a file-sharing, protocol like NFS, At this time, the parent directory of the update target is also required, and the access control information of that parent directory is required as well. Here, it is possible to easily collect necessary information regarding the parent directory if the information of parent directory data 8266 is acquired from the packet. In addition, the above-described entry may be omitted in the case where the parent directory data 8266 is not required.

The description has been concerned with the configuration of the system provided by the invention, the packet data structure in the processing request, and the configuration of the management information, up to now. Subsequently, a description will be concerned with a processing system for realizing the invention. Here, the description will be concerned with a file update list registration processing in FIG. 14, a file hierarchy control processing in FIG. 15 a file access processing in FIG. 16, an index update entirety processing in FIG. 17, a file update list inquiry processing in FIG. 18, a file data and metadata acquisition processing in FIG. 19, an index update processing in FIG. 20, and a search processing in FIG. 21.

Figure 14:
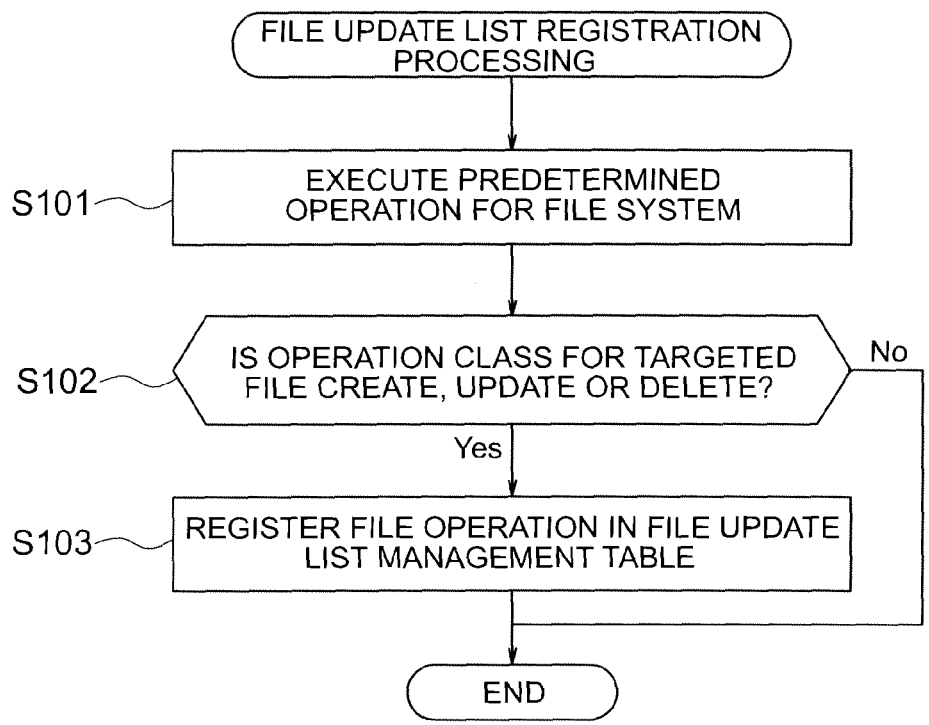
FIG. 14 is a flowchart for explaining a file update list registration processing in he first embodiment.

FIG. 14 is a flowchart showing the file update list registration processing to be carried out with the data management control program 2123 and change file notification control program 2125 at a time of carrying out a file access to the file system managed by the data management control program 2123 in the Tier 1 file server 2100. The change file notification control program 2125 always monitors the file access operation in the data management control program 2123 to carry out a predetermined operation as described below, when a necessary event occurs for the tile update list registration.

First, The data management control program 2123 receives a file access request to the ale system to thereafter execute a predetermined operation for the file system at a step S101. For example, if the request is a file creation request, a designated name file is created. If it is a file update request, a designated update content is reflected on the designated file. If it is a file deletion request, the designated file is deleted. Here, not only the operation to be targeted to the file but also the operation to be targeted to the directory is contained in a range of carrying out the file update list registration processing.

The data management control program 2123 checks whether the operation class for the targeted file is a creation, update or deletion at a step S102. That is, the processing step S102 determines whether a file operation is the event for carrying out the file update list registration. If the processing judges that the file operation is the event for carrying out the file update list registration (in the case of Yes at the step S102), the data management control program 2123 notifies to the change file notification control program 2125 to register the file operation in the file update list management table 6300 at a step S103 and terminate this entire processing. If the processing judges that the file operation is not the event for carrying out the file update list registration (in the case of No at the step S102), this entire processing is terminated without change.

Figure 15:
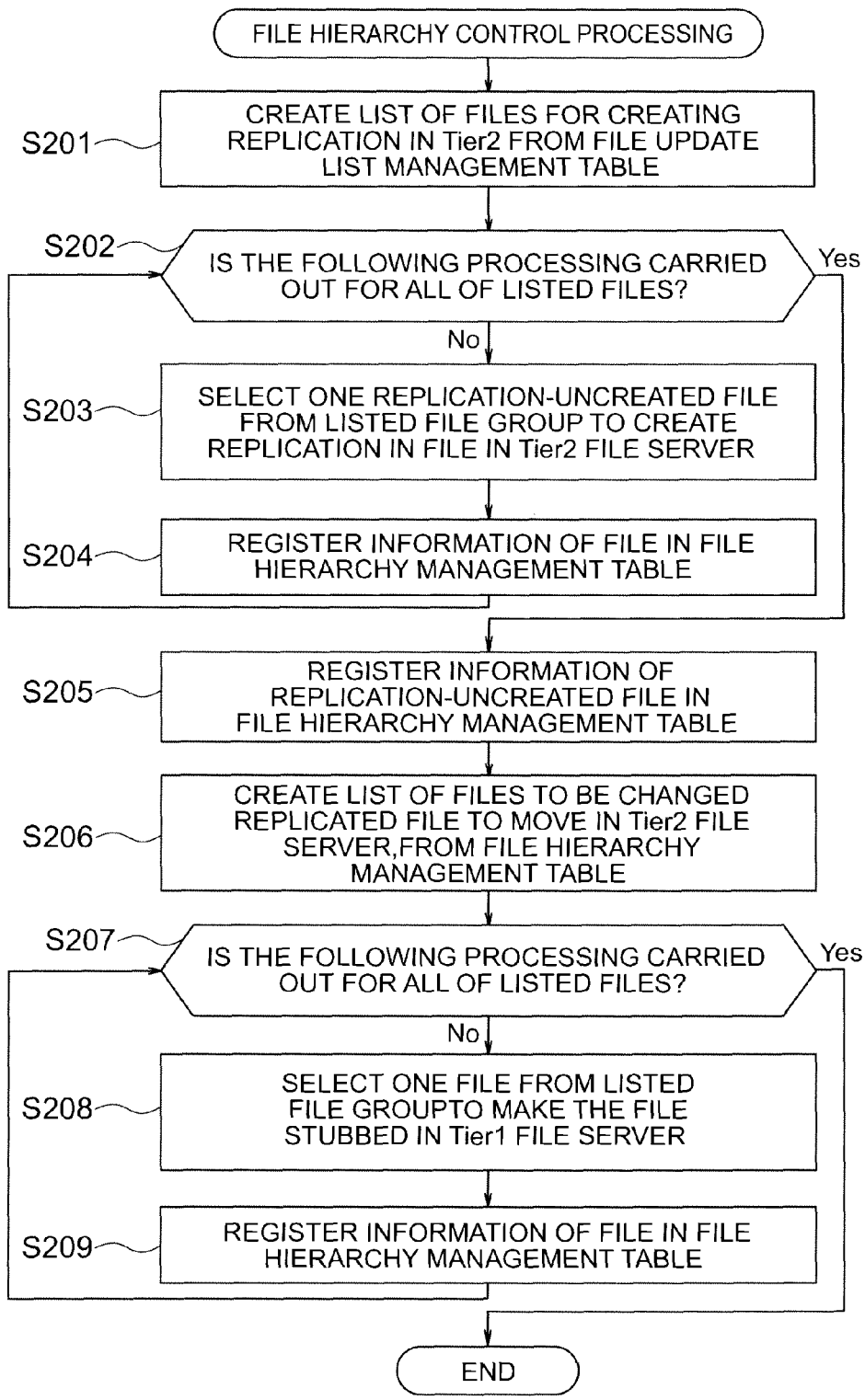
FIG. 15 is a flowchart for explaining a file hierarchy control processing in the first embodiment.

FIG. 15 is a flowchart showing the tile hierarchy control processing to be carried out by the file hierarchy management control program 2126 in the Tier 1 file server 2100. This processing in the processing sequence searches a file coincident with the predetermined condition, from among the files stored in the file system in the Tier 1 file server 2100, to replicate or move the file to the Tier 2 file server 3100. Here, a stub file of the file is made so as to be remained in the Tier 1 file server 2100 so that the access is carried out to the targeted file even after moved, in the case of moving the file.

First, the file hierarchy management control program 2126 acquires the content of file update list management table 6300 to create a list for the files to be required for creating the replication in the Tier 2 file server 3100 at a step S201. Here, a judgment criterion is set in advance. for judging whether the creation of replication is required. For example, the judgment criterion may be set such that the replication is created when the final update date and time of the targeted file is elapsed over one week from the present clock time The file hierarchy management control program 2126 then determines whether an after-described successive processing is carried out for all of the listed files at a step S202. If the processing is carried out for all of the files (in the case of Yes at the step S202), it proceeds to a step S205. In contrast, if it is not carried out for all of the files (in the case of No at the step S202), the tile hierarchy management control program 2126 selects one replication-uncreated file from the listed file group to create the replication of file in the Tier 2 file server 3100 at a step S203. Here, the file hierarchy management control program 2126 uses the Tier 2 file server-file access client control program 2127 to create the file in the Tier 2 file server 3100. Thereafter, the file hierarchy management control program 2126 registers the information of file in the file hierarchy management table 6400 at a step S204. Here, it registers the path name etc of the file in the Tier 2 file server 3100 created the replication. Thereafter, the processing returns to the step S202 to repeat it.

After ended the above described processing for all of the targeted files, the file hierarchy management control program 2126 registers the information of replication-uncreated file in the file hierarchy management table 6400 at a step S205. Here, it registers the information indicating that the replication has not been created for the file caused by error in a replication creation processing, in the file hierarchy management table 6400, even though the information is registered in the list of replication-created files. Specifically, an "unreplicated" as a state may be registered in the column of the management state 6440 in the file hierarchy management table 6400. The file hierarchy management control program 2126 then creates a list of files for changing a replicated file to "moved" to the Tier 2 file server 3100 from the file hierarchy management table 6400 at a step S206. Here, the judgment criterion is set in advance for judgment whether the file is changed from the replication to the move. For example, the judgment criterion may be set such that the file update list management table 6300 is referred to change the e from the replication to the move when the final update date and time of the targeted file s elapsed over one month from the present clock time. The file hierarchy management control program 2126 then determines whether an after-described successive processing is carried out for all of the listed files at a step S207. If the processing for the all of files are carried out (in the case of Yes at the step S207), this entire processing is terminated. In contrast, if it is not carried out (in the case of No at the step S207), the file hierarchy management control program 2126 selects one file from the listed file group to make the file stubbed in the Tier 1 file server 2100 at a step S208. Here, a content of data part of the targeted file is deleted, and it may be made so as to follow the information corresponding to the path name for storing the replication in the Tier 2 file server 3100. Thereafter, the file hierarchy management control program 2126 registers the information of file in the tile hierarchy management table 6400 at a step S209. Here, if the entry of target file is already registered the information as "migrated" is registered in the column of management state 6440 as this entry. Thereafter, the processing returns to the step S207 to repeat it.

Figure 16:
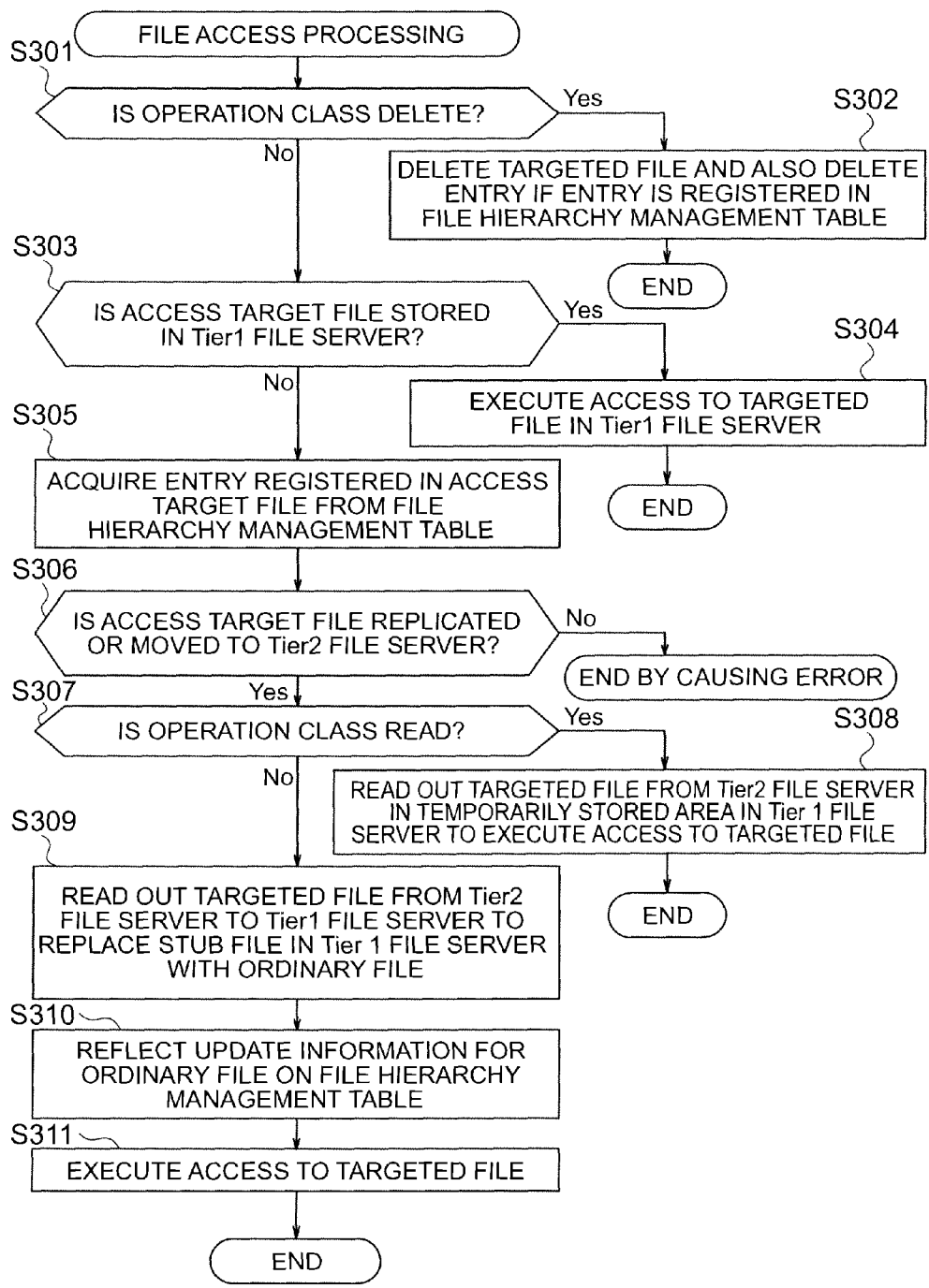
FIG. 16 is a flowchart for explaining a file access processing in the first embodiment.

FIG. 16 is a flowchart showing the file access processing when the Tier 1 file server 2100 receives the file access request from the user. In this processing, it is assumed that the Tier 1 file server 2100 and Tier 2 file server 3100 are configured as the hierarchy file storage and a part of the file in the Tier 1 file server 2100 is replicated or moved to the Tier 2 file server 3100.

First, the data management control program 2123 received the file access request checks whether the operation class of the targeted file access is "DELETE" at a step S301. If the operation class is "DELETE" (in the case of Yes at the step S301), the targeted file is deleted from the file system. If the entry of the targeted file is registered in the file hierarchy management table 6400, the entry is deleted at a step S302, and this entire processing terminates.

If the operation class is other than "DELETE" (in the case of No at the step S301 the processing checks whether the access target file is stored in the Tier 1 file server 2100 at a step S303. Here, it may check whether the targeted file of an unstubbed format is stored in the file system of the Tier 1 file server 2100. If such targeted file is stored in the Tier 1 file server 2100 (in the case of Yes at the step S303), a desirable access is executed for the targeted file in the Tier 1 file server 2100 at a step S304, and this entire processing terminates.

If the targeted file is not stored in the Tier 1 file server 2100 (in the case of No at the step S303), the entry for registering the access target file is acquired from the file hierarchy management table 6400 at a step S305. Thereafter, in response to the information of acquired entry, the processing determines whether the access target file is replicated or moved to the Tier 2 file server 3100 at a step S306. Here, it can be judged to check a content of the management state 6440 in the acquired entry. If the access target file is not replicated or moved to the Tier 2 file server 3100 (in the case of No at the step S305), this entire processing terminates due to an error.

If it is replicated or moved to the Tier 2 file server 3100 (in the case of Yes at the step S305), the processing checks whether the operation class of the access target file is "READ" at a step S307. If the operation class is "READ" (in the case of Yes at a step S307), the targeted file is read out from the Tier 2 file server 3100 to a temporarily stored area, such as a memory in the Tier 1 file server 2100, to execute the access to the targeted file at a step S308 and terminate this entire processing. Here, the temporarily stored area in the Tier 1 file server 2100 may be released at an arbitrary time, and the read-out target data stored in it may also be released at that time. For example, they may also be released at a time of when a CLOSE operation is carried out for the targeted file, when a certain period of time is elapsed from the read into the temporarily stored area etc.

If the operation class is not "READ" (in the case of No at the step S307) the targeted file is read out from the Tier 2 file server 3100 to the Tier 1 file server 2100 to replace the stub file in the Tier 1 file server 2100 with an ordinary file, at a step S309. Thereafter, update information for the ordinary file is reflected on the file hierarchy management table 6400 at a step S310. For example, the information stored in the column of Tier 2 storage location 6430 may be deleted, and the information stored in the column of management state 6340 may also be changed to information corresponding to the "unreplicated". Thereafter, the data management control program 2123 executes a desirable access to the targeted file at a step S311, and this entire processing terminates.

Figure 17:
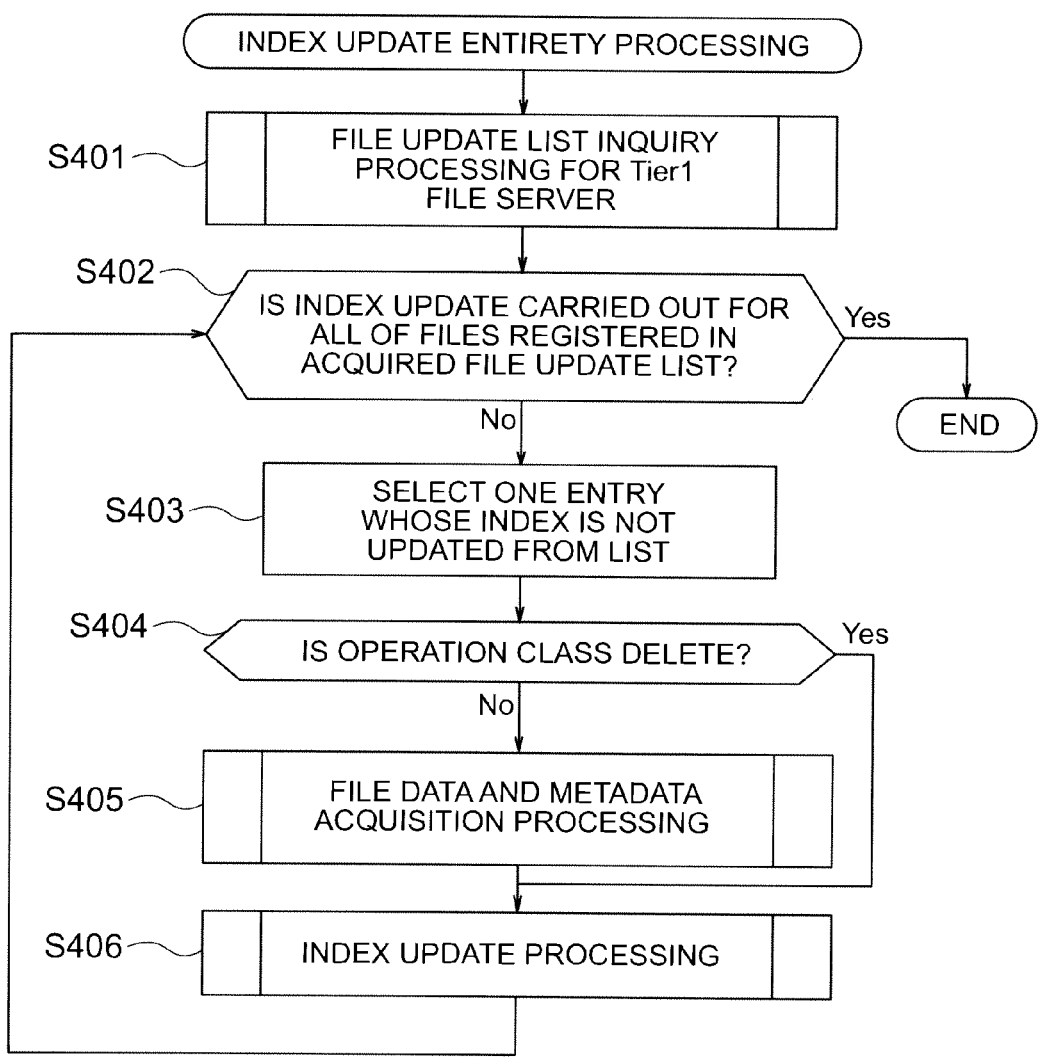
FIG. 17 is a flowchart for explaining an index update entirety processing in the first embodiment.

FIG. 17 is a flowchart showing the index update entirety processing for a search target file group stored in the hierarchy file storage in the search server 1100. In this processing, a list of the updated target file is acquired from the Tier 1 file server 2100, and the data and metadata regarding the updated target file are acquired from the Tier 2 file server 3100 to then carry out the index update.

First, the file update hit inquiry control subprogram 1171 in the search server 1100 carries out the file update list inquiry processing for the Tier 1 file server 2100 at a step S401. Here, the date and time at which the previous index update is carried out in the search server 1100 is designated as the starting point of an inquiry target time period, and the present time point is designated as the ending point of the inquiry target time period. The inquiry processing is then carried out. This processing will be described later. The processing checks whether the index update is carried out for the all of files registered in the acquired file update list at a step S402. If the index update is carried out for the all of targeted files (in the case of Yes at the step S402), this entire processing terminates.

The index update is not carried out for the all of targeted files (in the case of No at the step S402), one entry whose index is unupdated is selected from the list at a step S403. The processing checks whether the operation class registered in the selected entry is "DELETE" at a step S404. If the operation class is "DELETE" (in the case of Yes at the step S404), the processing proceeds to an after-described processing step S406. If it is not "DELETE" (in the case of No at the step S404), the file access control subprogram 1172 carries out the file data and metadata acquisition processing at a step S405. The indexing control subprogram 1173 carries out the index update processing on the basis of the data and metadata of acquired file at a step S406. Thereafter. the processing returns to the step S402 to then repeat it.

Figure 18:
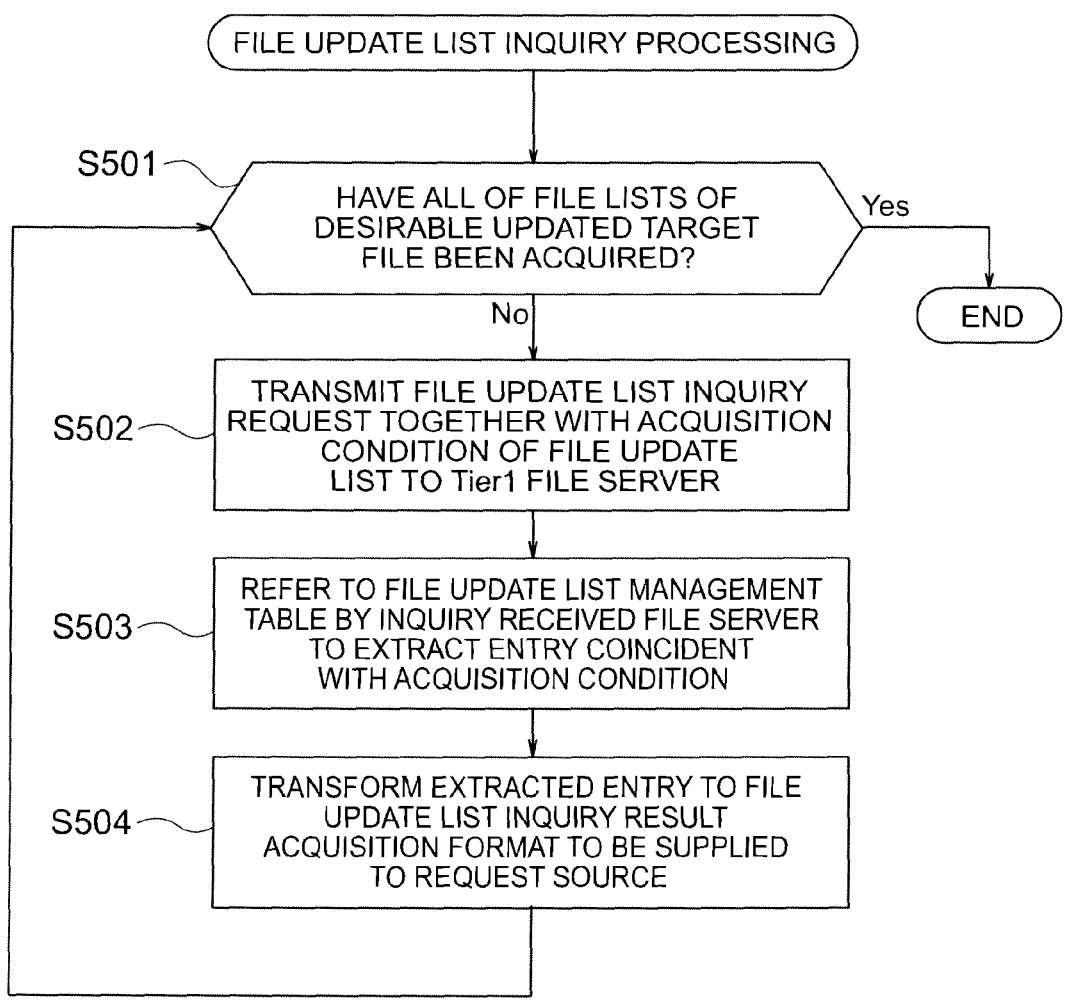
FIG. 18 is a flowchart for explaining a file update list inquiry processing in the first embodiment.

FIG. 18 is a flowchart showing the file update list inquiry processing of the step S401 in FIG. 17. First, the file update list inquiry control subprogram 1171 judges whether the search server 1100 has acquired the all lists of desirable updated target file at a step S501. Here, the processing judges whether all of elements to be divided and acquired have been acquired, since there is a case where the index update target list is sometimes divided and acquired lithe all of lists have been acquired (in the case of Yes at the step S501), this entire processing terminates.

If they have not been acquired all (in the case of No at the step S501), the file update list inquiry control subprogram 1171 transmits a file update list inquiry request together with an acquisition condition of the file update list to the Tier 1 file server 2100 at a step S502. Here, the file update list inquiry request is transmitted by designating the information of the format indicated by the file update list inquiry packet when carrying out the inquiry request. The change file notification control program 2125 in the Tier 1 file server 2100 received the inquiry refers to the file update list 6300 to extract the entry coincident with the designated acquisition condition at a step S503. Thereafter, the change file notification control program 2125 transforms the extracted entry to a file update list inquiry result acquisition format to be supplied to the search server 1100 as a request source at a step S504. Here, a reply is carried out by designating the information of the format indicated by the file update list inquiry result acquisition packet 8200 when transmitting a result. Thereafter, the processing returns to the step S501 to repeat it.

Figure 19:
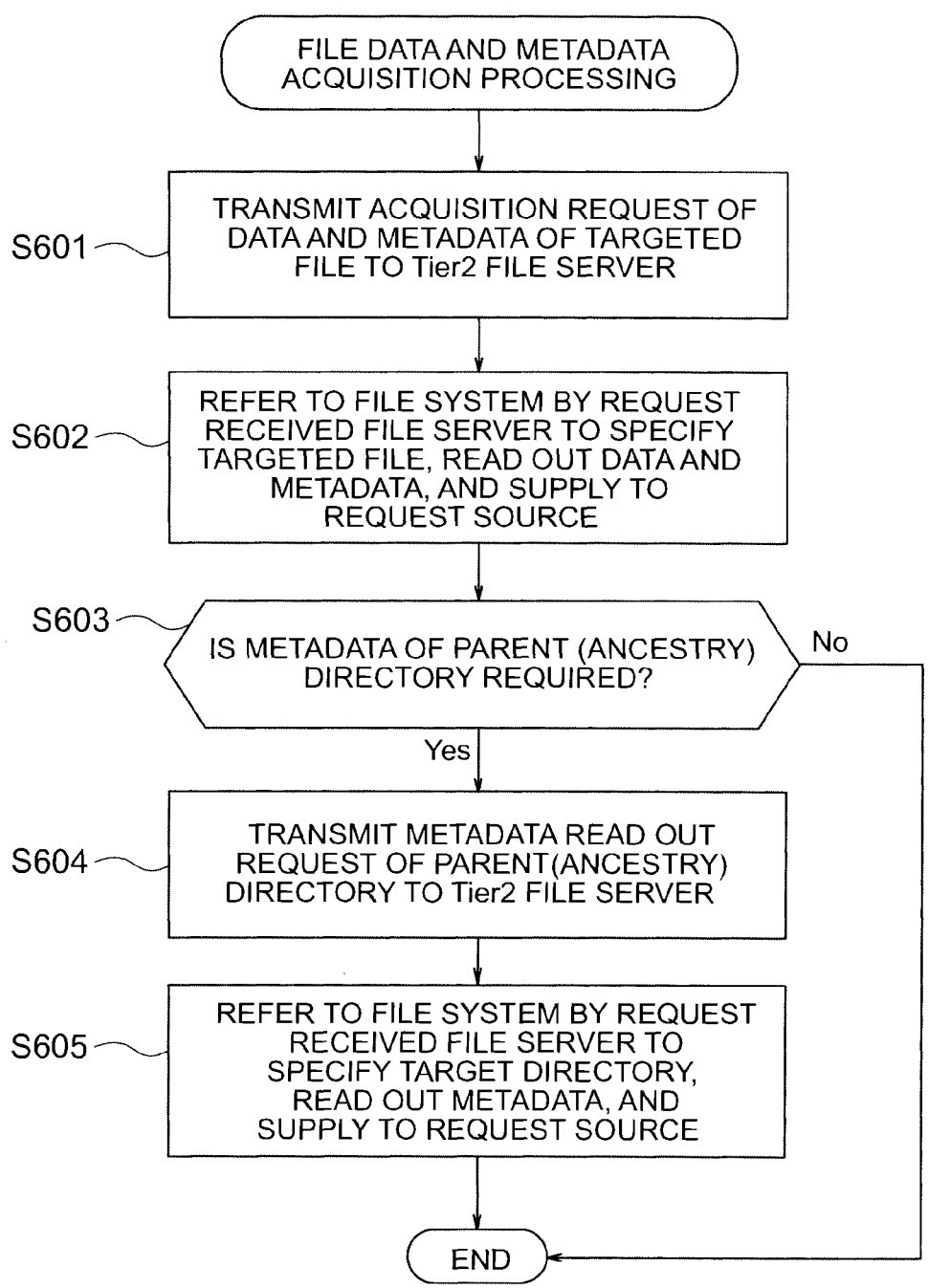
FIG. 19 is a flowchart for explaining a file data and metadata acquisition processing in the first embodiment.

FIG. 19 is a flowchart showing the file data and metadata acquisition processing of the step S405 in FIG. 17 First, the file access control subprogram 1172 transmits an acquisition request for the data and metadata of the targeted file to the Tier 2 file server 3100 at a step S601. It is required that the Tier 2 file server 3100 should respond not only to the file access request from the Tier 1 file server 2100, but also to it from the search server 1100, for responding to the acquisition request of the data and metadata. The file-sharing control program 3124 in the Tier 2 file server 3100 received the request refers to the file system to specify the targeted file, read out the data and metadata of the targeted file, and supply to the request source, at a step S602. The file access control subprogram 1172 fudges whether the metadata of the parent directory and ancestry directory of targeted file is required at a step S603. For example, access right information of the directory is also required for carrying out the access control of file when the targeted file uses NFS as the file-sharing protocol. Therefore, the metadata of the parent and ancestry directories becomes required. If the metadata of directory is not required (in the case of No at the step S603), this entire processing terminates.

If the metadata of directory is required (in the case of Yes at the step S603), the file access control subprogram 1172 transmits the acquisition request of the metadata of the targeted directory to the Tier 2 file server 3100 at a step S604. The file-sharing control program 3124 in the Tier 2 file server 3100 received the request refers to the file system to specify the targeted directory, read out the metadata of the targeted directory, and supply to the request source, at a step S605. In addition, when it is required to acquire the metadata of plural directories, the steps S604 and S605 may be executed repeatedly by a necessary number of times.

Figure 20:
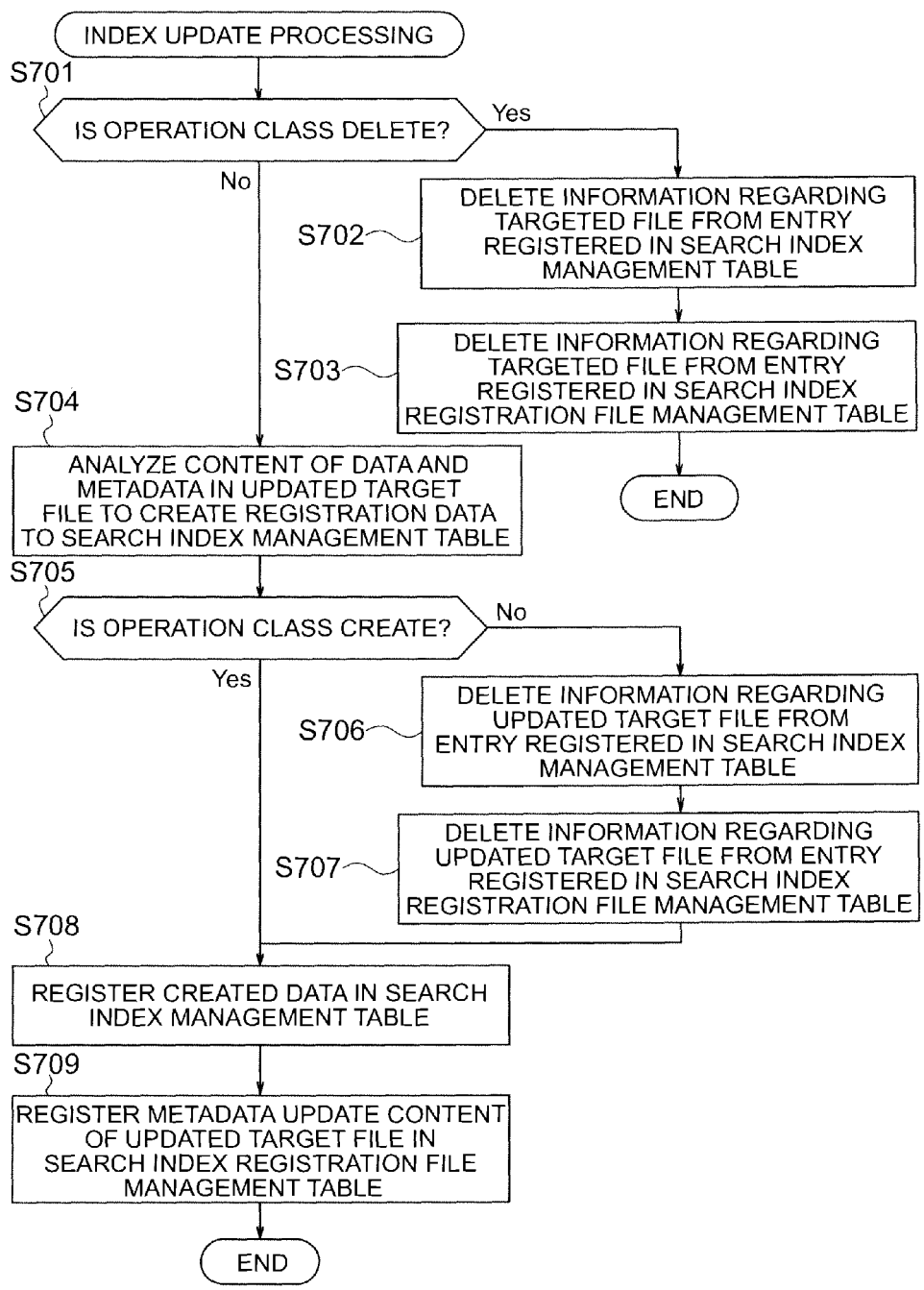
FIG. 20 is a flowchart for explaining an index update processing in the first embodiment.

FIG. 20 is a flowchart showing the index update processing of the step S406 in FIG. 17. First, the indexing control subprogram 1173 checks the operation class for the updated target file in the file update list to then check whether the operation class is "DELETE" at a step S701. If the operation class is "DELETE" (in the case of Yes at the step S701), the indexing control subprogram 1173 extracts the information regarding the targeted file from the entry registered in the search index management table 6100 to delete the information from the management table at a step S702. Thereafter, the indexing control subprogram 1173 extracts the information regarding the targeted file from the entry registered in the search index registration file management table 6200, delete the information from the management table at a step S703, and terminate this entire processing.

If the operation class is not "DELETE" (in the case of No at the step S701) the indexing control subprogram 1173 analyzes the content of data and metadata of the updated target file to create registration data in the search index management table 6100 at a step 5704. Here, likewise, the metadata of directory for storing the targeted file is also analyzed to create the registration data in the search index management table 6100, as required. Likewise to the step S701, the indexing control subprogram 1173 checks the operation class for the updated target file in the file update list to check whether that operation class is "CREATE" at a step S705. If the operation class is "CREATE" (in the case of Yes at the step S705), the processing proceeds to an after-described processing step S708.

If the operation class is not "CREATE" in the case of No at the step S705), the indexing control subprogram 1173 extracts the information regarding the targeted file from the entry registered in the search index management table 6100 to delete the information from the management table at a step S706. Thereafter, the indexing control subprogram 1173 extracts the information regarding the targeted file from the entry registered in the search index registration file management table 6200 to delete the information from the management table at a step S707. At the steps S706 and S707, it is required that the information regarding the targeted file is updated, therefore, the information before the update is deleted at this time point. In addition, the deletion processing is not required, but an overwriting update may be carried out directly to the management table when managing such that the overwriting update is applied directly to that.

The indexing control subprogram 1173 registers data created at the step S704 in the search index management table 6100 at a step S708. Thereafter, the indexing control subprogram 1173 registers a metadata update content of the updated target file in the search index register file management table 6200 at a step S709, and this entire processing terminates. Therefore, the information after the index update is reflected on the respective management tables by the processing at the steps S708 and S709.

Figure 21:
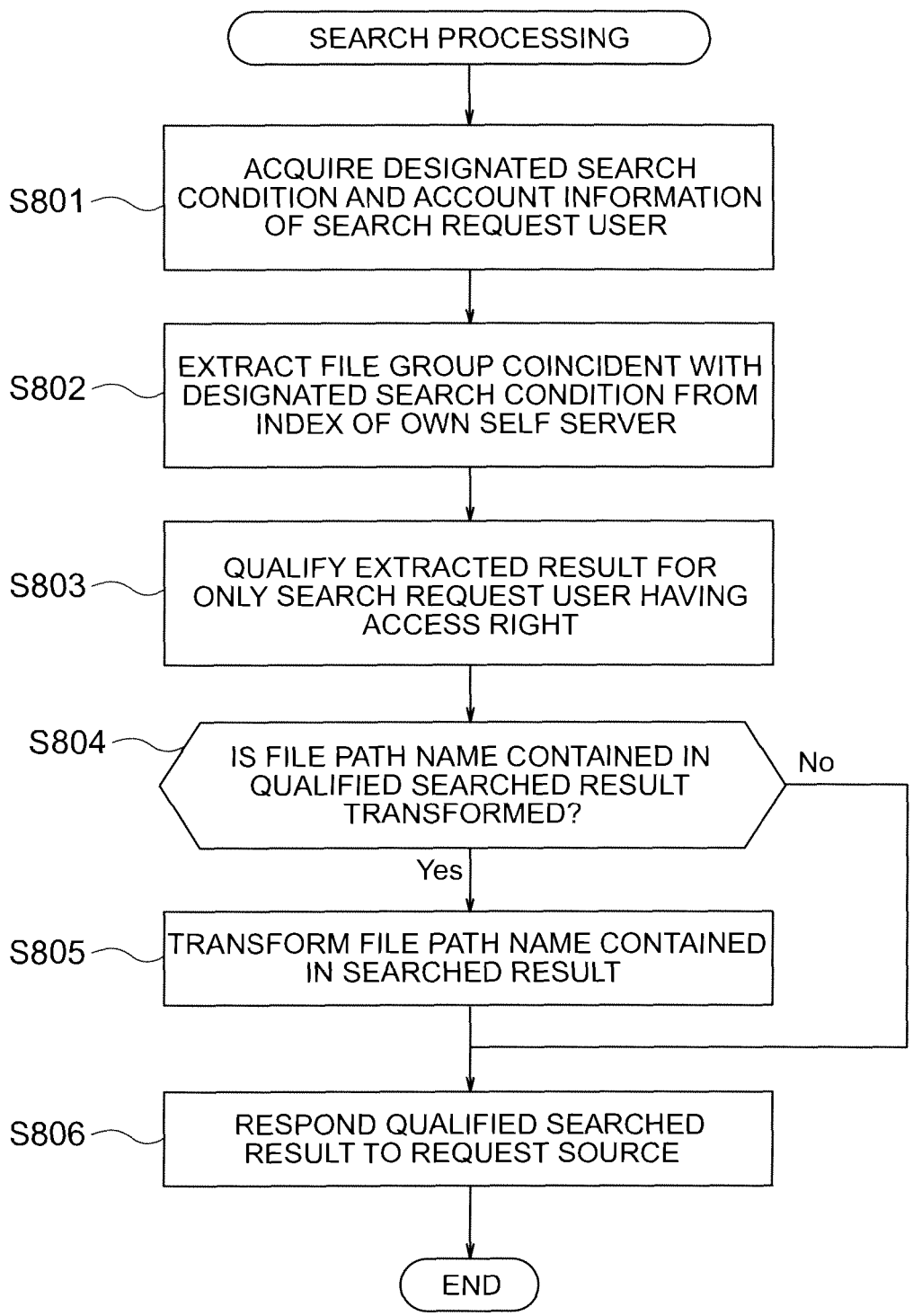
FIG. 21 is a flowchart for explaining a search processing in the first embodiment.

FIG. 21 is a flowchart showing the search processing using the search index in the search server 1100. Hereinafter, a description will be concerned with the search processing to be carried out by the search response control subprogram 1174 in the search server 1100. Specifically, the description will be concerned with the search processing when coming a search request processing to the search server 1100 from the search client control program 4124 in the client machine 4100.

First, the search response control subprogram 1174 analyzes a content of a search request sent from a search request source to acquire a designated search condition and account information of a search request user etc., at a step S801. The search response control subprogram 1174 uses the search index management table 6110 of the on self search server to extract the file group coincident with the designated search condition at a step S802. In addition, a file path name of the extracted file groups is acquired from the search index registration file management table 6210. After extracted the tile group, the search response control subprogram 1174 checks whether the search request user has an access right to all of the extracted files, and the user having the access right is only qualified at a step S803. Here, the qualification for the user may be carried out on the basis of the access control information set in the extracted file and that of the search request user. That is when the file having no access right from the search request user is contained in the extracted tile, this file is eliminated from the searched result. After qualified the search request user, the search response control subprogram 1174 judges whether the tile path name contained in the qualified search result is transformed at a step S804. Here, since the search server 1100 acquires the updated target file from the Tier 2 file server 3100, the file path name of the targeted file in the Tier 2 file server 3100 is contained in the searched result when doing nothing particularly. In this case, the access cannot be carried out to the targeted file by the file path name when the user does not have an access method to the Tier 2 file server 3100. For this reason, it is judged whether the file path name of the user is transformed to a file path name of the file associated with the targeted file in the Tier 1 file server having the access method. The file path name can be transformed by using two pieces of the information stored in the path name 8265 of the above-described file update list inquiry result acquisition packet 8200, that is, using the information regarding the path name 6420 in the Tier 1 file server 2100 and the Tier 2 storage location 6430 in the Tier 2 file server 3100. In this embodiment, the file path name may be transformed by a default. In this regard, it may also be made so as not to transform the file path name, in response to an ambient condition.

If the file path name is not transformed (in the case of No at the step S804), the processing proceeds to an after-described processing step S806, If the file path name is transformed (in the case of Yes at the step S804), the targeted file path name contained in the searched result is transformed at a step S805. After terminated the above-described processing, the qualified searched result is responded to the request source, and the entire processing, terminates at the step S806.

In the first embodiment, the search server 1100 can acquire not only the path name in the front-end side file server (Tier 1 file server 2100) regarding the updated target file, but also the path name in the back-end side file server (Tier 2 file server 3100), through a communication with the front-end side file server. By acquiring the path name in the back-end side file server, the data and metadata of the updated target file can be acquired not only from the front-end side file server but also from the back-end side file server when it is required that the search server 1100 acquires the data and metadata of the updated target file.

The path name in the front-end side file server can also be output to the searched result supplied from the search server. In this way, the user uses the searched result to be able to access to the file, therefore, the contribution to accessibility to the file from the user can be improved.

The first embodiment has been described above, however, the invention is not limited thereto and various changes and modifications may be made without departing from the spirit of the invention.

(Embodiment 2)

In the above-described first embodiment, the data and metadata regarding the updated target file is stored in the file update list inquiry result acquisition packet 8200, and the information required for acquiring the metadata regarding the directory for storing the targeted file is also stored therein. In contrast, in the Tier 1 file server 2100, there also exists the access control information settable in the file-sharing level, as access control information to a storage file in the file share, when using CIFS (Common Internet File system) as file-sharing protocol.

For this reason, a configuration is required so as to acquire the access control information set in the file-sharing level, when the search server 1100 acquires the file update list from the Tier 1 file server 2100. Therefore, a second embodiment will be described below with a control method of acquiring the access control information set in the file share which stores the file, together with a file list, when the search server 1100 acquires the file list becoming the index update target for the Tier 1 file server 2100.

As described above, it is required that the structure of file update list inquiry result acquisition packet 8200 and a part of the index update processing are changed so that the access control information set in the file share is acquired together with the list of file becoming the index update target to be able to use in the index update processing. These changed contents will be described with reference to FIG. 22 and FIG. 23.

Figure 22:
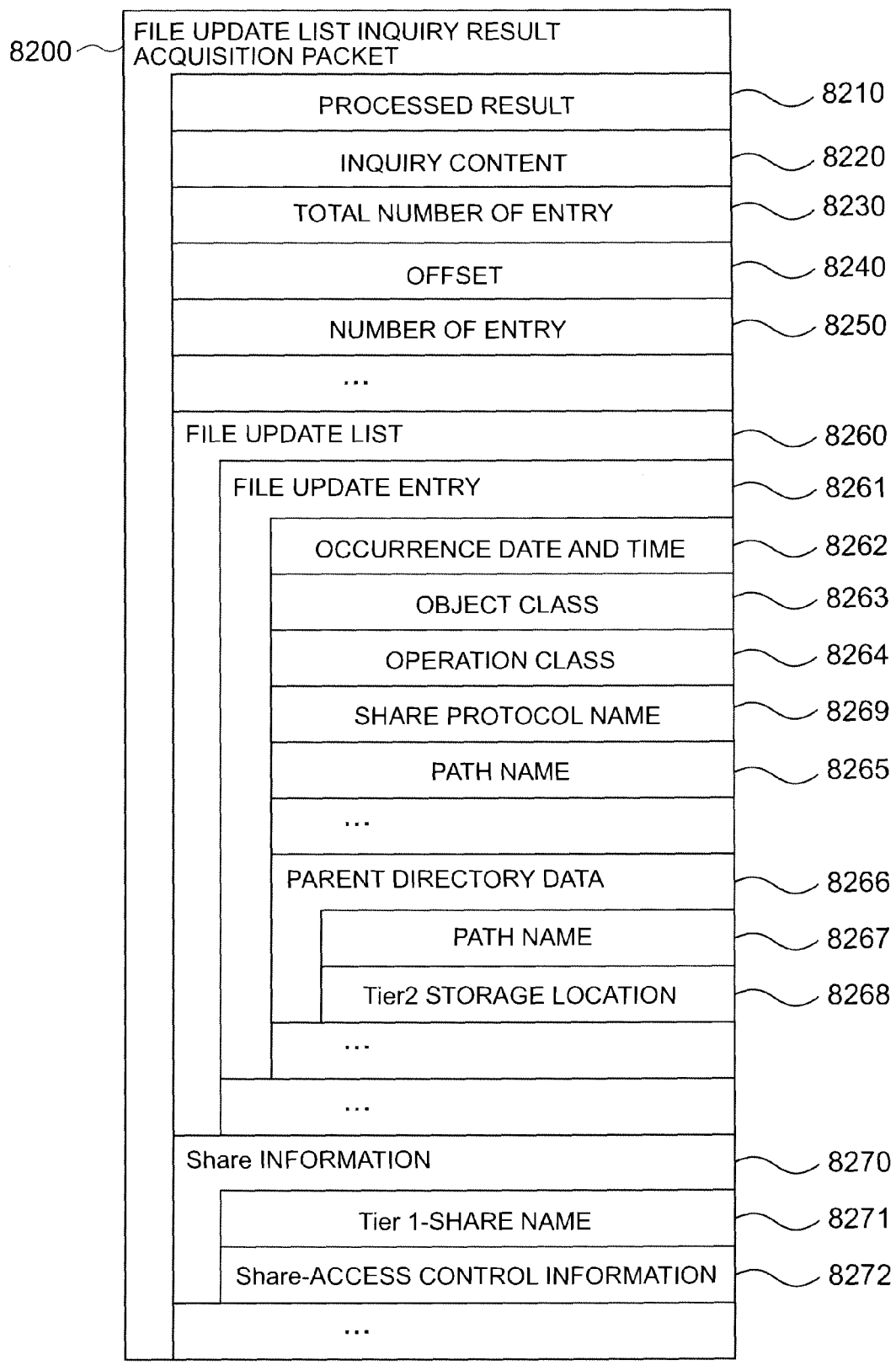
FIG. 22 is a diagram showing a data structure of the file update list inquiry result acquisition packet in a second embodiment.

FIG. 22 is a diagram showing the changed content in the file update list inquiry result acquisition packet 8200 illustrated in FIG. 13. This packet structure is different in that it also stores the access control information set in the file-sharing level for storing the targeted file, compared with the packet structure illustrated in FIG. 13. Specifically, that packet structure will be described below.

The changed point in FIG. 2 from FIG. 13 is that an attribute as a share protocol name 8269 is added to the file update entry 8261 and an attribute as share information 8270 is added to the packet structure. The share protocol name 8269 stores identification information of the file-sharing protocol relative to storing the updated target file. For example, it may store the identification information such as NFS or CIFS. The share information 8270 stores information regarding the file share storing the updated target file. Specifically, it may store two attributes, such as a Tier 1-share name 8271 and share-access control information 8272.

The Tier 1-share name 8271 stores information for identifying the file share storing the updated target tile. For example, it may store the information corresponding to a host name and path name of when accessing to the file share via the network. The share-access control information 8272 stores the access control information set in the file share. For example, it may store ACT information etc, set in the file share.

Figure 23:
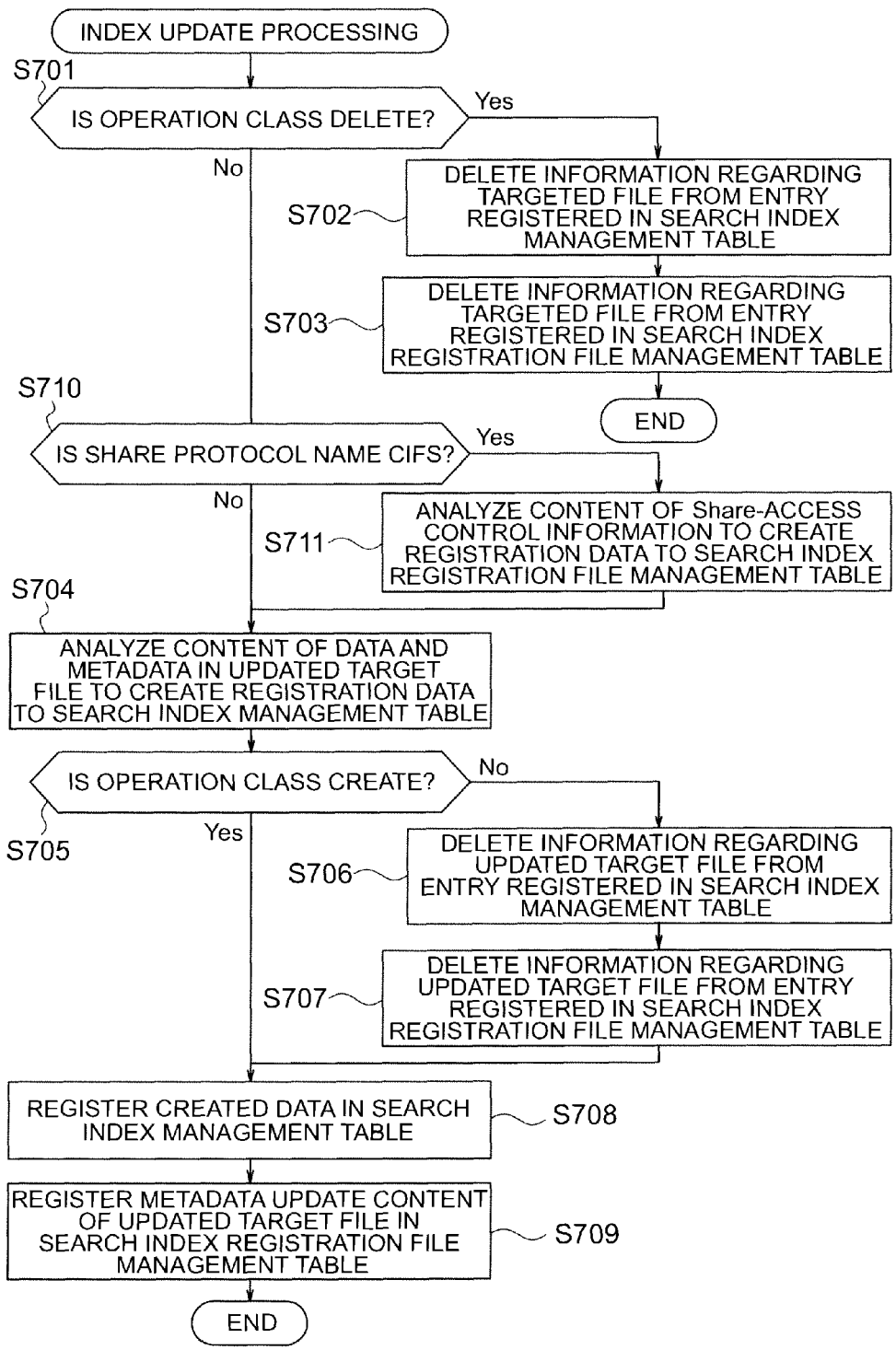
FIG. 23 is a flowchart for explaining the index update processing in the second embodiment.

FIG. 23 is a flowchart showing changed parts from the index update processing illustrated in FIG. 20. This processing in FIG. 23 is different in that the class of file-sharing protocol used in the file share storing the updated target file is checked so as to carry out the index update also using the information stored in the file-sharing level. This processing will be described below in detail.

In the flowchart in FIG. 23, the changed point from FIG. 20 is that a step S710 and a step S711 are newly added to between the steps S701 and S704, and other steps are identical to those in FIG. 20. Therefore, the newly added steps will only be described below.

If the operation class is not DELETE at the step S701, the indexing control subprogram 1173 checks the share protocol name 8269 for the updated target file in the file update list to check whether the share protocol name is CIFS at a step S710. If the share protocol name is not CIFS (in the case of No at the step S710), the processing proceeds to the step S704. If it is CIFS (in the case of Yes at the step S710), the indexing control subprogram 1173 analyzes the content of the share-access control information 8272 to create registration data to the search index registration file management table 6200 at a step S711. Here, the created registration data is registered as a part of the metadata 6230 of the file to be able to use it in the search when the information regarding the file is registered in the search index registration file management table 6200. Thereafter, the processing proceeds to the step S704

By carrying out the above-described processing, it is possible that the search server 1100 acquires the access control information set in the file share to be reflected on the search index, and apply to the qualification for the searched result on the basis of the access right in the search, even in the case of using CIES as the file-sharing protocol in the Tier 1 file server 2100.

(Embodiment 3)

In the above-described first embodiment, the file update list inquiry result acquisition packet 8200 stores the data and metadata regarding the updated target file and the information required for acquiring the metadata regarding the directory storing the targeted file. In contrast, it is required that the host name and an IP address of the Tier 1 file server 2100 and Tier 2 file server 3100 are specified so that the access is carried out actually to these file servers. The host name and IP address are sometimes fixed in operation of the system and sometimes changed dynamically in the operation.

For this reason, a configuration is required to be able to acquire the information required for accessing to the Tier 1 file server 2100 and Tier 2 file server 3100, when the search server 1100 acquires the file update list from the Tier 1 file server 2100. Therefore, a third embodiment will be described below with a control method of acquiring information required for accessing to the Tier 1 file server 2100 and Tier 2 file server d 100 together with the file list, when the search server 1100 acquires the file list becoming the updated target for the Tier 1 file server 2100.

As described above, it is required that the structure of the file update list inquiry result acquisition packet 8200, the file data and metadata acquisition processing and a part of the index update processing are changed so that the information required for accessing to the file server is acquired together with the list of files becoming the updated target to be able to use in the index update processing etc. These changed contents will be described with reference to FIG. 24, FIG. 25 and FIG. 26.

Figure 24:
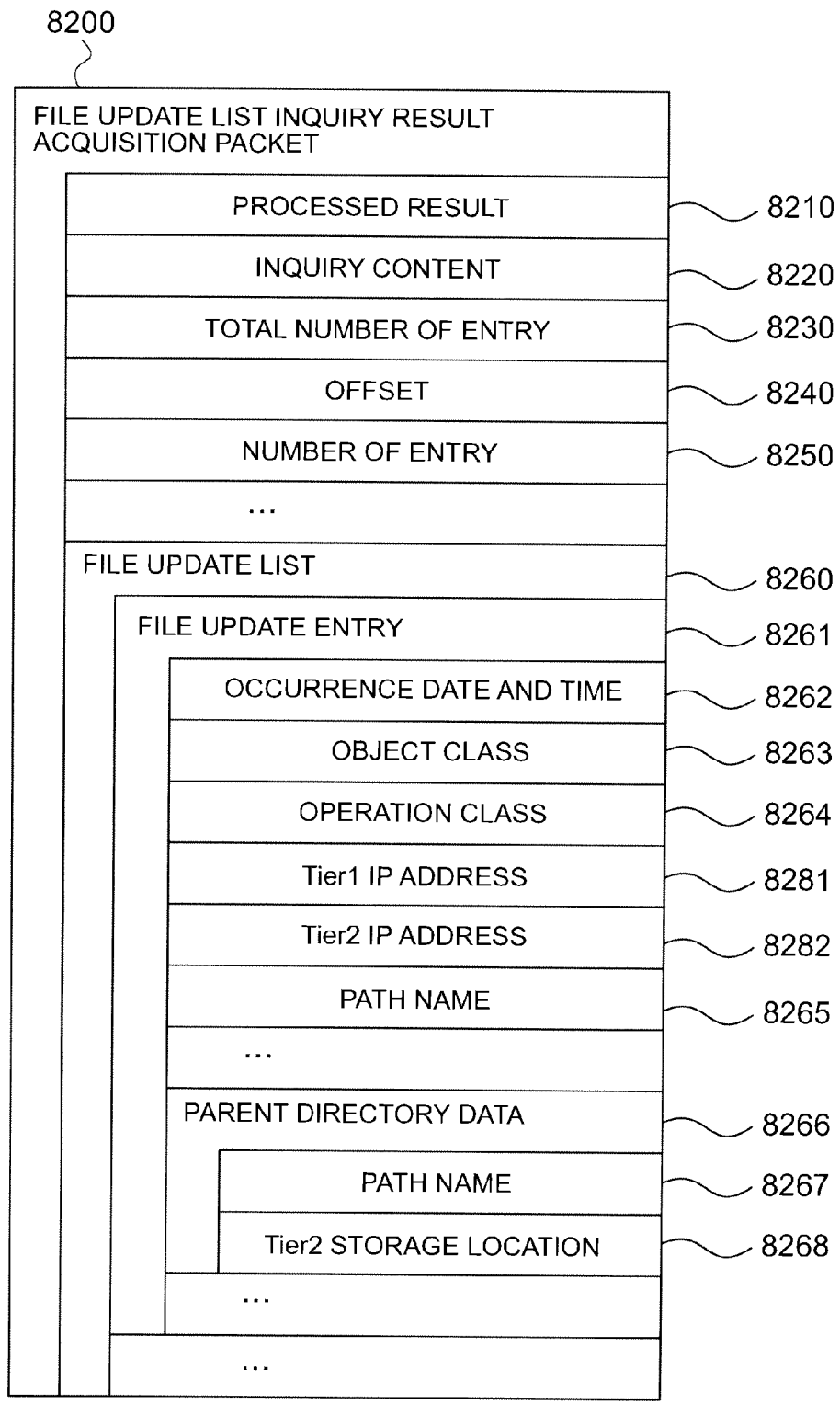
FIG. 24 is a diagram showing a data structure of the file update list inquiry result acquisition packet in a third embodiment.

FIG. 24 is a diagram showing the changed contents of the file update list inquiry result acquisition packet 8200 illustrated in FIG. 13. This packet structure is different in that the information for accessing to the file server storing the updated target file is also stored therein, compared with the packet structure illustrated in FIG 13. This packet structure will be described specifically below.

In FIG. 24, the changed point from FIG. 13 is that attributes as a Tier 1 IP address 8281 and a Tier 2 IP address 8282 are added to the file update entry 8261.

The Tier 1 IP address 8281 stores identification information required for accessing to the Tier 1 file server 2100. Specifically, it stores an IP address required for accessing via the network In addition, other information may be used if it is identification information for specifying uniquely the file server to be able to access to it, other than the IP address. The Tier 2 IP address 8282 stores the identification information required for accessing to the Tier 2 file server 3100. Specific storage information is identical to that in the Tier 1 IP address 8281.

Figure 25:
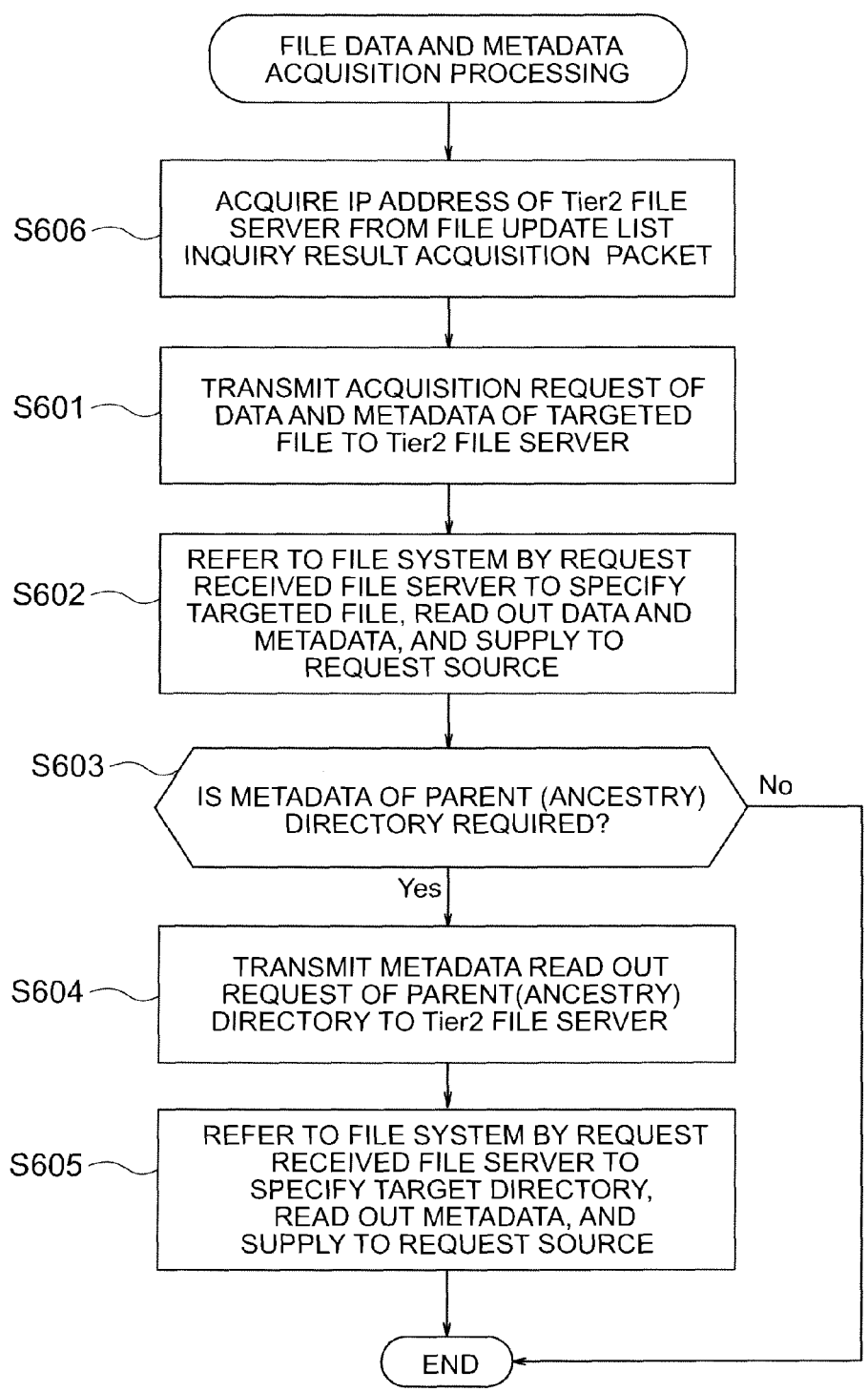
FIG. 25 is a flowchart for explaining file data and metadata acquisition processing in the third embodiment.

FIG. 25 is a flowchart showing the changed content of the file data and metadata acquisition processing illustrated in FIG. 19. This processing sequence is different in that the IP address information of Tier 2 file server 3100 is acquired to then carry out the acquisition processing for the data and metadata of the updated target file, compared with the file data and metadata acquisition processing illustrated in FIG. 19. This processing will be described specifically below.

In FIG. 25, the changed point from FIG. 19 is that a processing step S606 is newly added to before the step S601. The other steps are identical to those in FIG. 19. The added step will only be described below.

At the front of this processing, the file access control subprogram 1172 acquires the IP address of Tier 2 file server 3100 from the file update list inquiry result acquisition packet 8200 at the step S606. Here, it refers to the column of the Tier 2 IP address 8282 in the tile update list inquiry result acquisition packet 8200 to acquire necessary information. Incidentally, a value acquired at that step is not limited to the format such as IP address. Any format may be acceptable if the necessary information identifies the Tier 2 file server uniquely to be able to access to it. Thereafter, the processing proceeds to the step S601, and the same processing is carried out as shown in FIG. 19. In addition, the Tier 2 IP address acquired at the step S606 can be used in accessing to the Tier 2 file server 3100 in this processing sequence.

Figure 26:
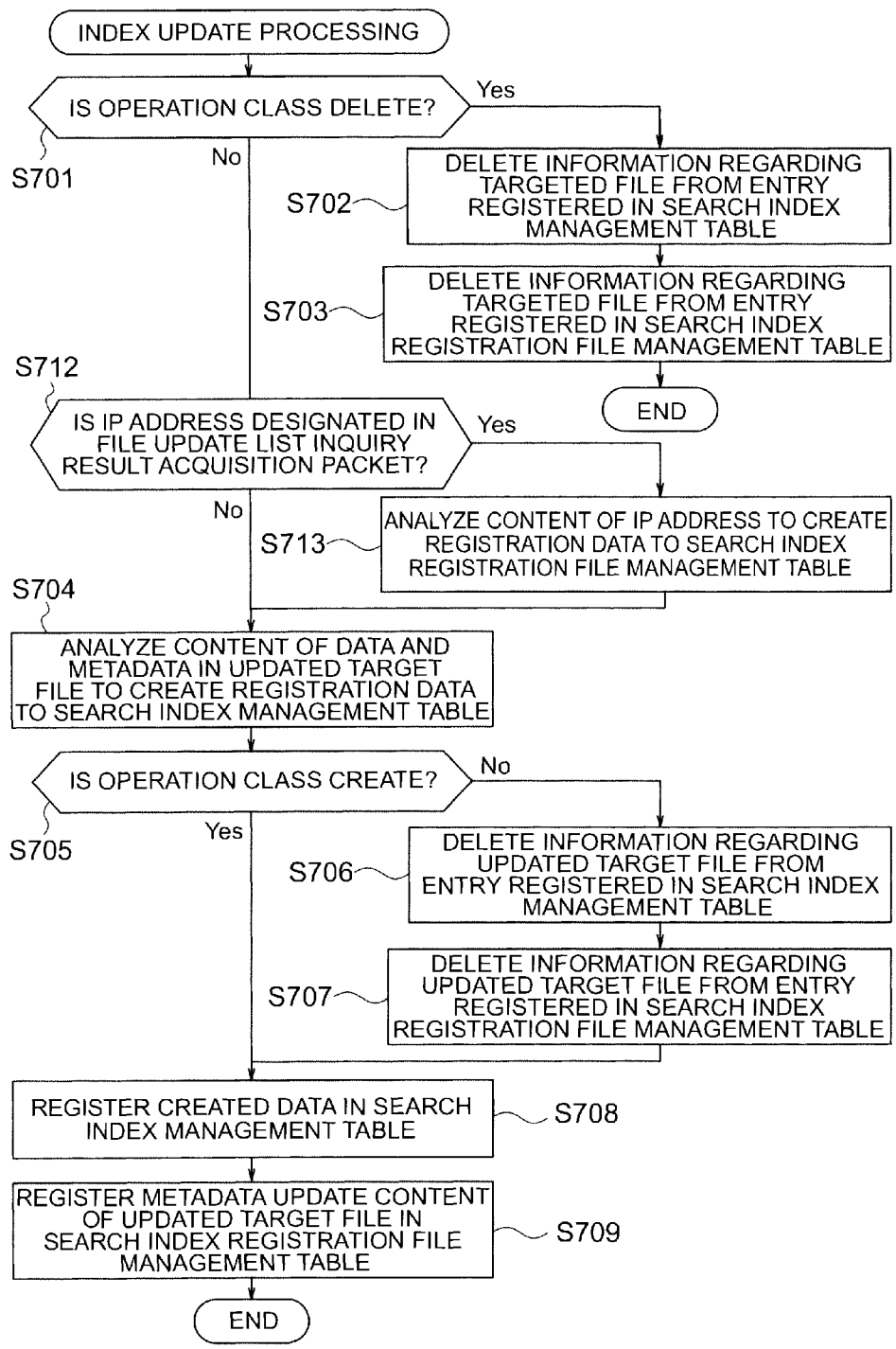
FIG. 26 is a flowchart for explaining the index update processing in the third embodiment.

FIG. 26 is a flowchart showing a changed content in the index update processing illustrated in FIG. 20. This processing sequence is different in that the index update can be carried out even by using the information regarding the IP address for accessing to the Tier 1 file server 2100 storing the updated target file, compared with the index update processing illustrated in FIG. 20. This processing will be described specifically below.

In FIG. 26, the changed point from FIG. 20 is that steps S712 and S713 are added to before the step S704 if the operation class is not DELETE at the step S701. The other steps are identical to those in FIG. 20, The added steps will only be described below.

If the processing determines as No at the step S701, the indexing control subprogram 1173 checks whether the Tier 1 IP address 8281 is designated for the updated target file in the file update list at the step S712. If it is not designated (in the case of No at the step S712), the processing proceeds to the step S704. If it is designated (in the case of Yes at the step S712), the indexing control subprogram 1173 analyzes the content of IP address to create registration data in the search index registration file management table 6200 at the step S713. Here, the created registration data is registered as a part of the metadata 6320 of the file to be able to use in the search and the file access, when the information regarding the file is registered in the search index registration file management table 6200. Thereafter, the processing proceeds to the step S704.

By carrying out the above-described processing, the search server 1100 can access to the Tier 1 file server 2100 and Tier 2 file server 3100 even when the identification information such as IP address of the file servers is dynamically changed.

(Embodiment 4)

In the above-described first embodiment, the data and metadata regarding the updated target file and the information required for acquiring the metadata regarding the directory for storing the targeted file are stored in the file update list inquiry result acquisition packet 8200. In contrast, it can be assumed that there are cases: the updated target file is stored only in the Tier 1 file server 2100 in the hierarchy file storage; it is stored in both the Tier 1 file server 2100 and Tier 2 file server 3100; and the Tier 1 file server 2100 is stubbed and it is stored only in the Tier 2 file server 3100.

For this reason, when the search server 1100 carries out the index update, another configuration is required such that it can prepare for a case, other than the first embodiment assuming that the updated target file is present in the Tier 2 file server 3100. Therefore, a control method as a fourth embodiment will he described below in such a way that the information indicating what a storage condition of the updated target file is stated in the hierarchy file storage is also acquired together with the file list, when the search server 1100 acquires the file list becoming the index update target for the Tier 1 file server 2100.

As described above, it is required that the structure of file update list inquiry result acquisition packet 8200 and a part of the file data and metadata acquisition processing are changed so that the information indicating the storage condition of the updated target file is acquired together with the list of the file becoming the updated target so as to be able to use in the index update processing etc. These changed contents will be described with reference to FIG. 27 and FIG. 28.

Figure 27:
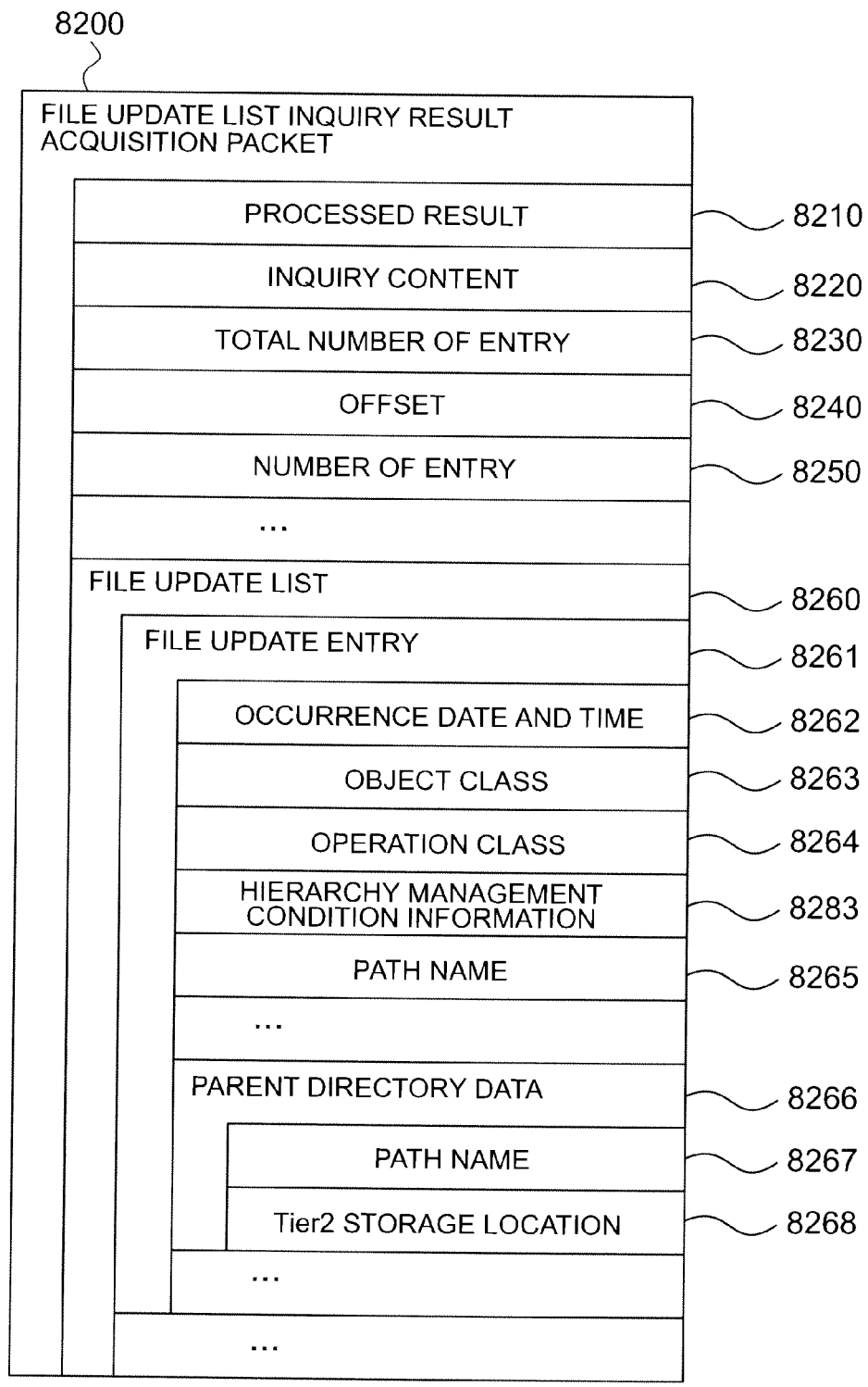
FIG. 27 is a diagram showing a data structure of the file update list inquiry result acquisition packet in a fourth embodiment.

FIG. 27 is a diagram showing the changed contents of the file update inquiry result acquisition packet 8200 illustrated in FIG. 13. This packet structure is different in that hierarchy management condition information of the updated target file is also stored, compared with the packet structure illustrated in FIG. 13. This processing will be described specifically below.

In FIG 27, a changed point from FIG. 13 is that an attribute as a hierarchy management condition information 8283 is added to the file update entry 8261. The hierarchy management condition information 8283 stores information indicating which of the files storages stores the updated target file. For example, it may store as "unreplicated" if the updated target file is stored only in the Tier 1 file server 2100, store as "replicated" if the updated target file is stored in both the Tier 1 file server 2100 and Tier 2 file server 3100, and store as "migrated" if the Tier 1 file server 2100 is stubbed and the updated target file is stored only in the Tier 2 file server 3100.

Figure 28:
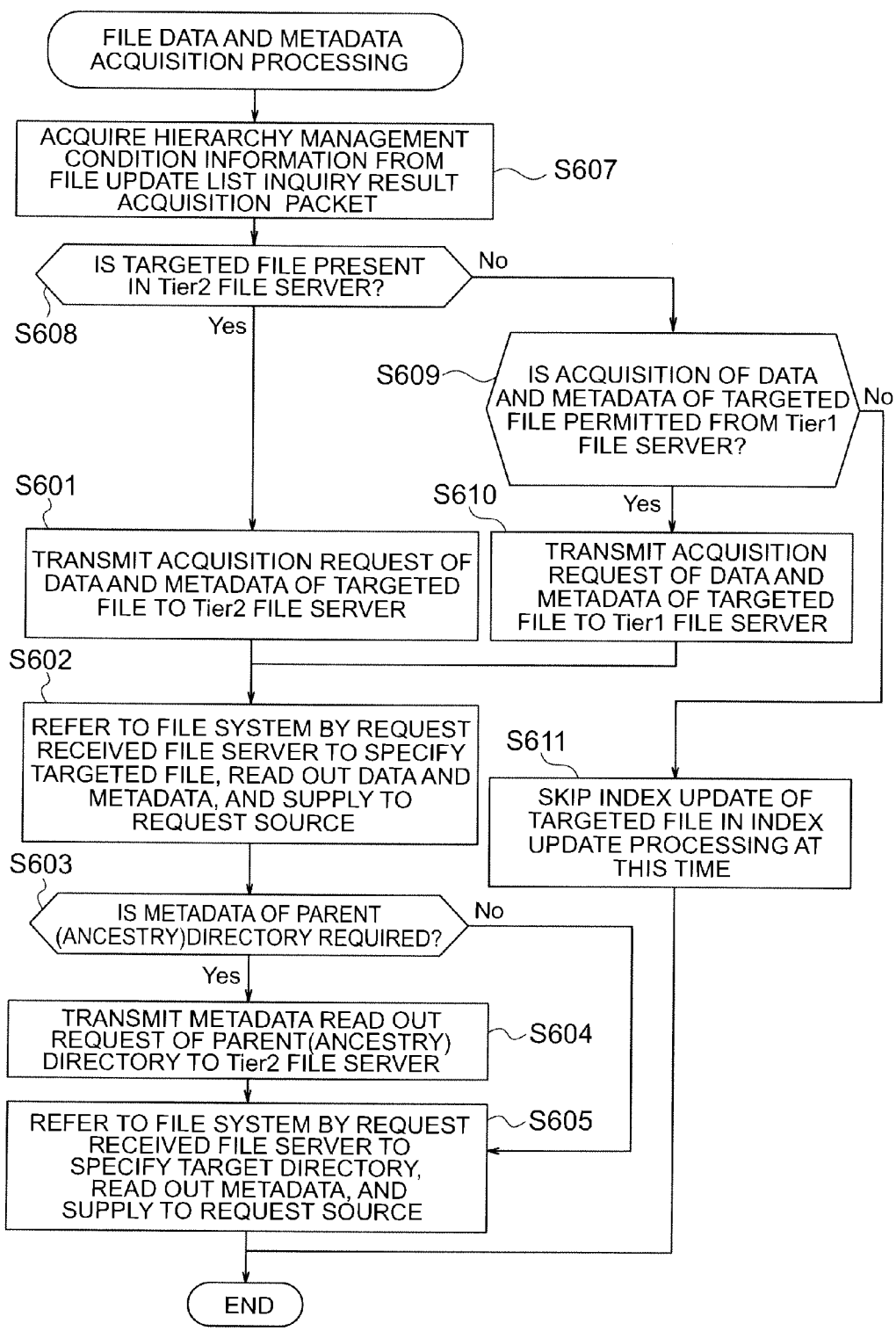
FIG. 28 is a flowchart for explaining the file data and metadata acquisition processing in the fourth embodiment.

FIG. 28 is a flowchart showing a changed content of the file data and metadata acquisition processing illustrated in FIG. 19. This processing sequence is different in that it checks which of the file servers stores the updated target file to carry out a processing for acquiring information required for the index update even in the case where the updated target file is only present in the Tier 1 file server 2100 and a processing for skipping the index update of the file in the case where the updated target file is only present in the Tier 1 file server 2100, compared with the file data and metadata acquisition processing illustrated in FIG. 19. This processing will be described specifically below.

In FIG. 28, a changed point from FIG. 19 is that processing steps S607, S608, S609, S610 and S611 are newly added to before the step S601. The other steps are identical to those in FIG. 19. The added steps will only be described below.

At the front of this processing, the file access control subprogram 1172 acquires the hierarchy management condition information 8283 of the updated target file from the file update list inquiry result acquisition packet 8200 at the step S607. Here, it refers to the column of the hierarchy management condition information 8283 in the file update list inquiry result acquisition packet 8200 to acquire necessary information. Incidentally, the information acquired from this step indicates how the hierarchy file storage stores the updated target file. For example, the information indicates such as "unreplicated", "replicated" and "migrated". The file access control subprogram 1172 judges whether the updated target file is present in the Tier 2 file server 3100 at the step S608. Here, the judgment is carried out on the basis of the content of hierarchy management condition information 8283. If the information of "replicated" or "migrated" is stored therein, it can be said that the updated target file is present in the Tier 2 file server 3100. If the updated target file is present in the Tier 2 file server 3100 (in the case of Yes at the step S608), the processing proceeds to the step S601.

If it is not present in the Tier 2 file server 3100 (in the case of No at the step S608), the file access control subprogram 1172 judges whether the acquisition for the data and metadata of the targeted file is permitted from the Tier 1 file server 2100 at the step S609. Here, it may be made that the judgment selects any processing in response to a policy setting in the system entirety. For example, the acquisition from the Tier 1 file server 2100 may be permitted in the system entirety, and it may also be made so as not to be permitted. Further, it may be made so as to judge whether the information is acquired in response to a situation by reference to the operation status of Tier 1 file server 2100. Here, if the information acquisition from the Tier 1 file server 2100 is permitted (in the case of Yes at the step S609), the file access control subprogram 1172 transmits an acquisition request of the data and metadata of the updated target file to the Tier 1 file server 2100 at the step S610. Thereafter, the processing proceeds to the step S602, and the Tier 1 file server 2100 carries out the subsequent processing.

If it is not permitted (in the case No at the step S609), the file access control subprogram 1172 skips the index update for the targeted file in the index update processing at this time, at the step S611. This corresponds to the case where the data acquisition from the Tier 1 file server 2100 is not permitted in a condition where desirable data is only present in the Tier 1 file server 2100. In such case, it is originally difficult to acquire the desirable data, therefore, the index update processing is abandoned for the file at this time, and the index update processing should be tried again in a next chance.

By carrying out the above-described processing, the search server 1100 acquires necessary data and metadata to be able to use for the index update, even though the updated target file is present in either the Tier 1 file server 2100 or Tier 2 file server 3100.

(Embodiment 5)

In the above-described first embodiment, the data and metadata regarding the updated target file is stored in the file update list inquiry result acquisition packet 8200, and the information required for acquiring the metadata regarding the directory for storing the targeted file is also stored therein. In contrast, the search server 1100 acquires the information regarding an access destination to again access to the target directory and carry out the processing for acquiring the necessary metadata, for the directory for storing the updated target file. Here, it is required that the access is carried out to the Tier 2 file server 3100 many times so that he search server 1100 acquires the metadata regarding the directory for storing the updated target file from the Tier 1 file server 2100. In the case where the network between the search server 1100 and Tier 2 file server 3100 is a high delay and low band, such number of access times is reduced as much as possible. In this way, there is also a possibility to arise necessity for attempting to enhance in performance of the processing.

For this reason, a configuration is required such that the metadata regarding the directory for storing the updated target file can be acquired collectively when acquiring the file update list. Therefore, a control method as a fifth embodiment will be described below such that the directory for storing the file and the information regarding the all of metadata in the ancestry directory storing that directory are acquired together with the file list, when the search server 1100 acquires the file list becoming the updated target for the Tier 1 file server 2100.

As describe above, it is required that the structure of file update list inquiry result acquisition packet 8200 and a part of the file data and metadata acquisition processing are changed so that the metadata setting in the directory is acquired together with the list of file becoming the index update target to be able to use in the index update processing. These changed contents will be described with reference to FIG. 29 and FIG. 30.

Figure 29:
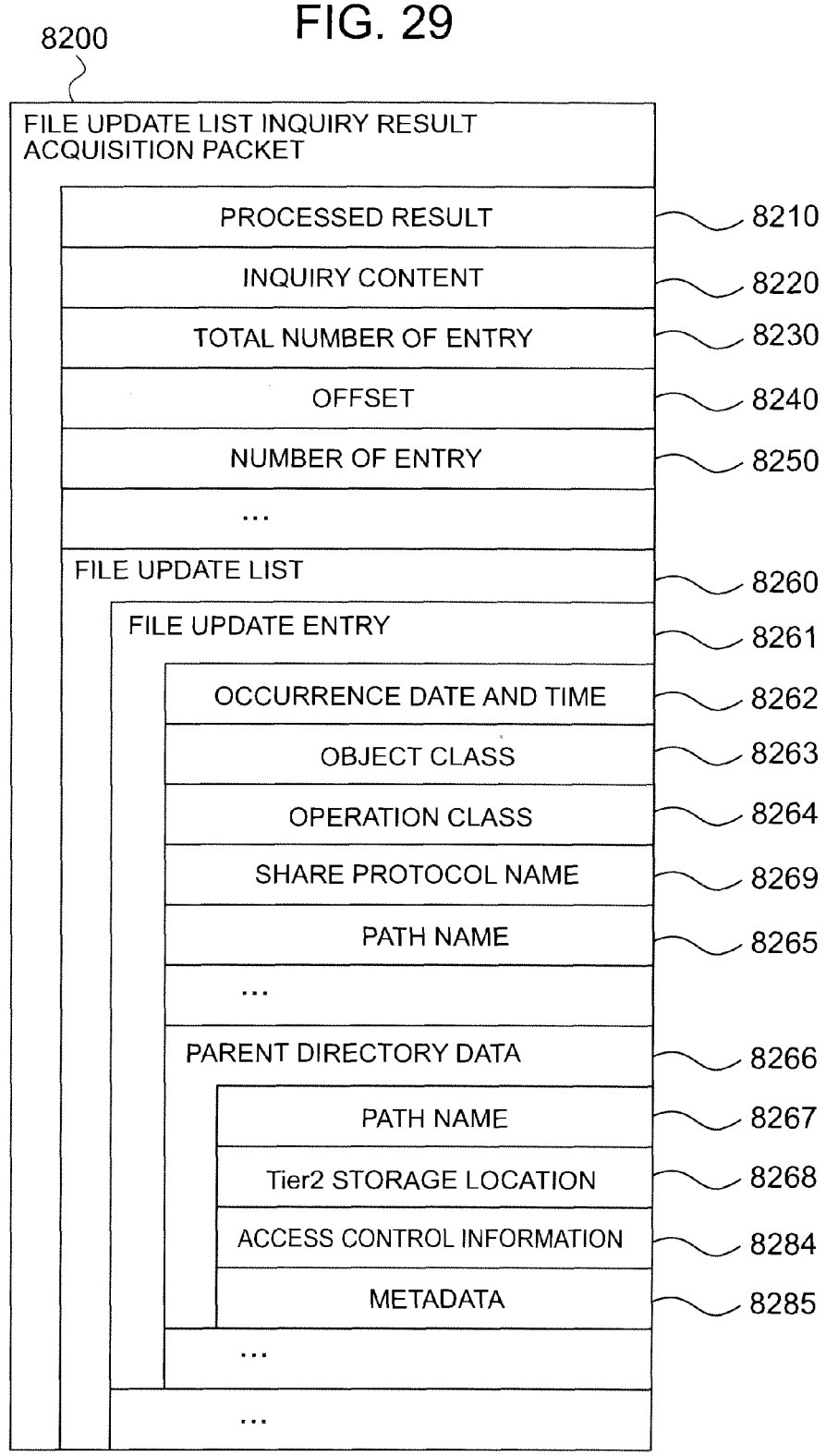
FIG. 29 is a diagram showing a data structure of the file update list inquiry result acquisition packet in a fifth embodiment.

FIG. 29 is a diagram showing the changed contents of file update list inquiry result acquisition packet 8200 illustrated in FIG. 13. This packet structure is different in that the information regarding the director, is stored in the parent directory data 8266 of the updated target file, compared with the packet structure illustrated in FIG. 13. This processing will be described specifically below.

In FIG. 29, the changed point from FIG. 13 is that an attribute as access control information 8284 and an attribute as metadata 8285 are added to the parent directory data 8266. The access control information 8284 stores access control information set in the directory. For example, it may store permission bit information, used for the access control, set in the directory and ACL information, etc. The metadata 8285 stores various metadata information set in the directory.

Figure 30:
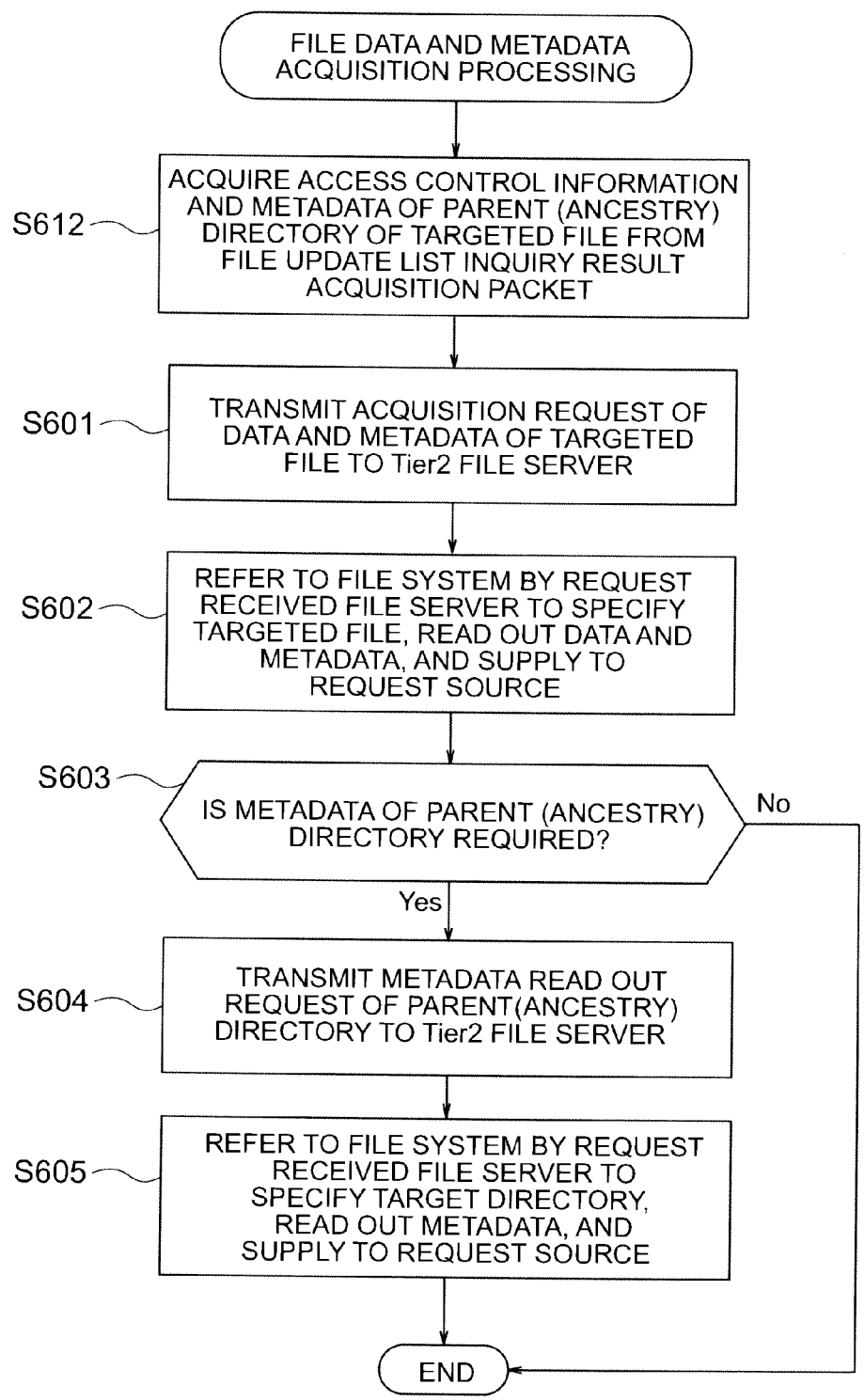
FIG. 30 is a flowchart for explaining the file data and metadata acquisition processing in the fifth embodiment.

FIG. 30 is a flowchart showing a changed content of the file data and metadata acquisition processing illustrated in FIG. 19. This processing sequence is different in that it can be made that both the access control information and metadata set in the directory for storing the updated target file can be acquired, compared with the file data and metadata acquisition processing illustrated in FIG. 19. This processing will be described specifically below.

In FIG. 30, a changed point from FIG. 19 is that a step S612 is newly added to before the step S601, The other steps are identical to those in FIG. 19. The newly added step will only be described below.

At the front of this processing the file access control subprogram 1172 acquires the parent directory of the updated target file, the access control information of the ancestry directory as required, and the metadata from the file update list inquiry result acquisition packet 8200, at the step S612. Here, it refers to the column of access control information 8284 and metadata 8285 in the file update list inquiry result acquisition packet 8200 to acquire necessary information. Here, the acquired information is used for when carrying out the index update regarding the file. Thereafter, the processing proceeds to the step S601. In addition, the processing at the step S603 may always be branched to No since the processing states that the metadata of the parent directory is acquired already.

By carrying out the above-described processing, the search server 1100 can acquire necessary information for the index update for the metadata of the parent directory and ancestry directory for storing the updated target file, without individually acquiring these from the Tier 2 file server 3100, so that an efficient processing can be carried out.

(Embodiment 6)

The above-described first embodiment has described that the information regarding the updated target file is acquired from the Tier 1 file server 2100. In contrast, it carp also be considered that similar information is acquired from the Tier 2 file server 3100. For example, in the case where the processing is carried out such that the file stored in the Tier 1 file server 2100 is immediately created as replication even in the Tier 2 file server 3100, the result of processing becomes the same even though the information regarding the updated target file is acquired from the Tier 2 file server 3100. It is also raised that a load sometimes becomes high caused by a simultaneous access from the users since the Tier 1 file server 2100 is the front-end side file server for accessing from the user. Therefore, the search server 1100 acquires the information regarding the updated target file even from the Tier 2 file server 3100 to be able to carry out the index update using that information, which can also be said beneficial.

For this reason, the Tier 2 file server 3100 requires a configuration such that it can create the fix update list to supply the list of the updated target file in response to a request from the search server 1100. Therefore, a control method as a sixth embodiment will be described below such that the Tier 2 file server 3100 creates the file update list to supply the list of updated target files in response to the request from the search server 1100.

As described above, it is required that the hardware configuration of Tier 2 file server 3100, the index update entirety processing and a part of the file update list inquiry processing are changed so that the Tier 2 file server 3100 creates the file update list. It can also be assumed that the information regarding the path name required for accessing to the file and directory in the Tier 1 file server 2100 are not propagated to the Tier 2 file server 3100.

Therefore, in such case, it is required to realize by adding a file path name inquiry processing. The former changed content will be described with reference to FIG. 31, FIG. 32 and FIG. 33. The latter added content will be described with reference to FIG. 34.

Figure 31:
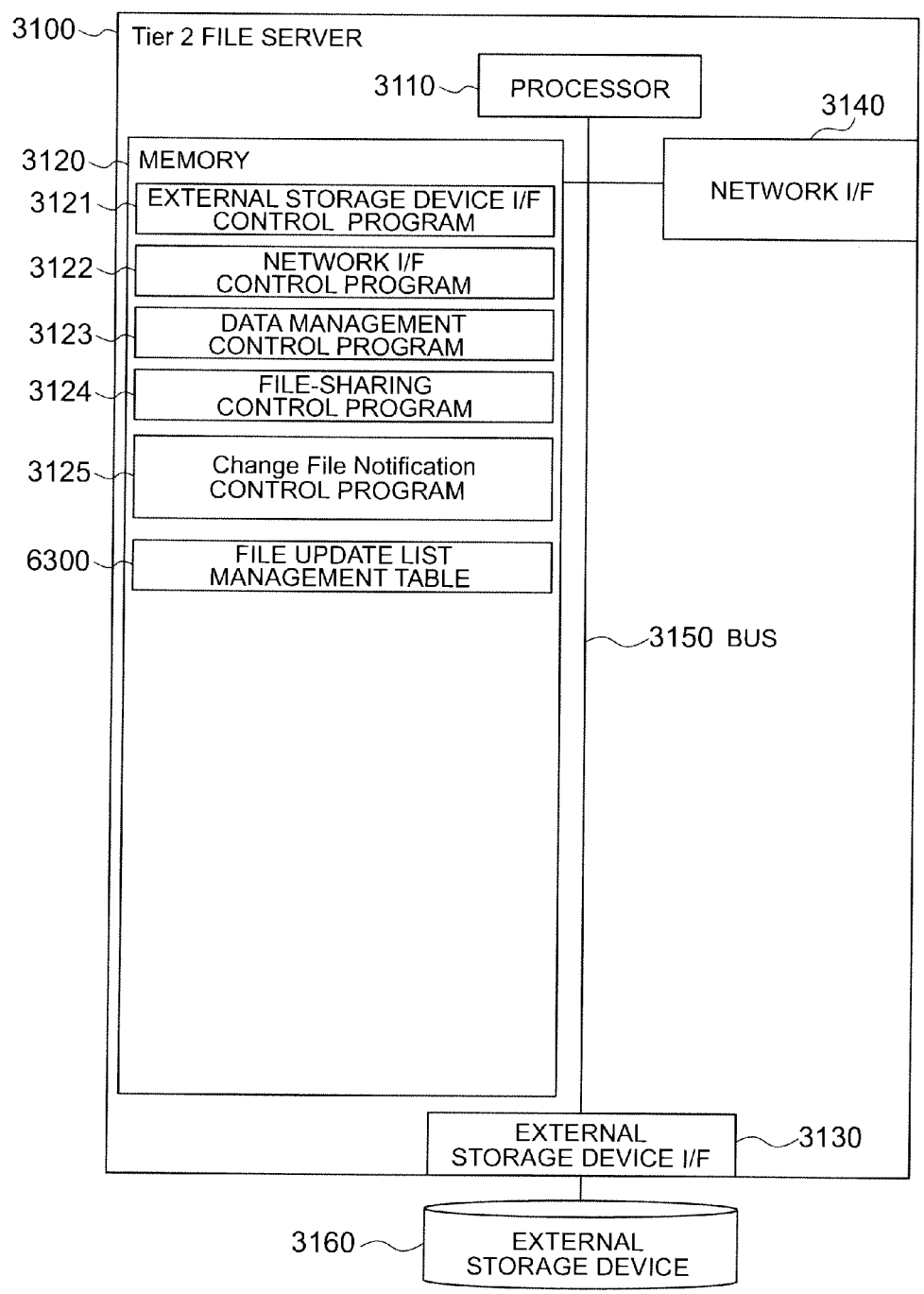
FIG. 31 is a diagram showing a configuration of the Tier 2 file server n a sixth embodiment.

FIG. 31 is a diagram showing the changed content of the hardware configuration for the Tier 2 file server 3100 illustrated in FIG. 4. This configuration is different from FIG. 4 in that a change file notification control program 3125 and a file update list management table 6300 are added thereto. The change file notification control program 3125 is identical to the change file notification control program 2125 in the Tier 1 file server 2100 illustrated in FIG. 3. The file update list management table 6300 is also identical to that illustrated in FIG. 9. The processing sequence to be supplied by the above-added control program and management table is identical to that as the processing content in the Tier 1 file server 2100 For this reason, description for this processing sequence is omitted.

Figure 32:
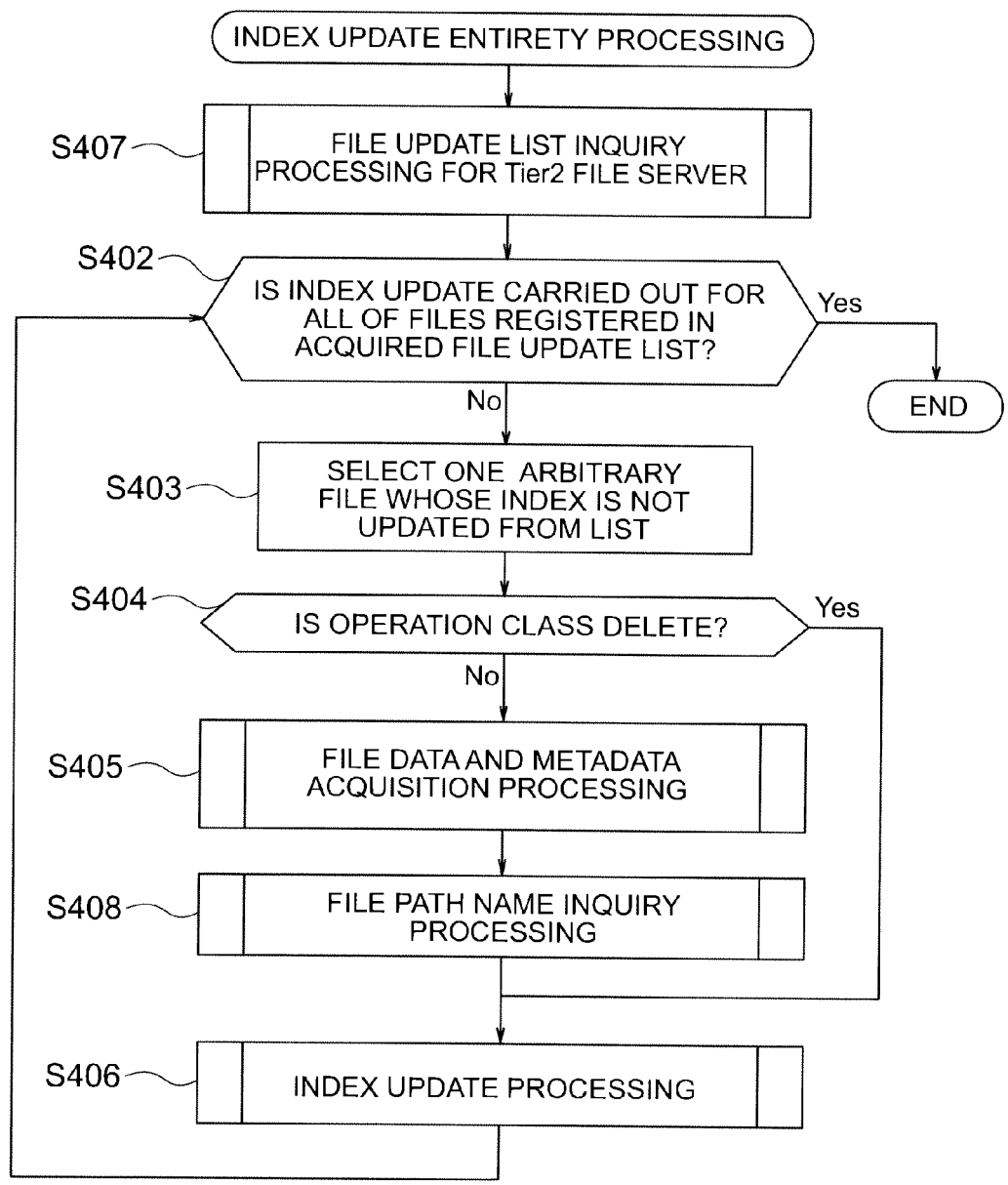
FIG. 32 is a flowchart for explaining the index update entirety processing in the sixth embodiment.

FIG. 32 is a flowchart showing a changed content of the index update entirety processing illustrated in FIG. 17. This processing sequence is different in that a tile update list inquiry processing is carried out for the Tier 2 file server 3100 and a file path name inquiry processing for transforming the file identification information in the Tier 2 file server 3100 into the path name in the Tier 1 file server 2100 is carried out for the Tier 1 file server 2100, compared with the index update entirety processing illustrated in FIG. 17. This processing will be described specifically below.

In FIG. 32, a changed point from FIG. 17 is that the step S401 is changed to another step S407 and a step S408 is newly added to after the step S405. The other steps are identical to those in FIG. 17. The changed and added steps will only be described below.

First, the file update list inquiry control subprogram 1171 in the search server 1100 carries out the file update list inquiry processing for the Tier 2 file server 3100 at the step S407. In FIG. 17, the inquiry is carried out for the Tier 1 file server 2100. This processing sequence is different in that the inquiry is carried out for the Tier 2 file server 3100. This processing will be described later. After carried out this processing, the processing proceeds to the step S402.

After executed the step S405, the file access control subprogram 1172 carries out the file path name inquiry processing for the Tier 1 file server 2100 at the step S408. This processing will be described later. After executed this processing, the processing proceeds to the step S406.

In add on the file path name inquiry processing is required for when path name information in the Tier 1 tie server 2100 is notified to the Tier 2 file server 3100 and it is therefore not stored and when the Tier 2 file server 2100 is not synchronized with the Tier 2 file server 3100. In this regard, when the path name information is notified to the Tier 2 file server 3100 and it is already stored, at the time of replicating and moving the file, this processing becomes unnecessary.

Figure 33:
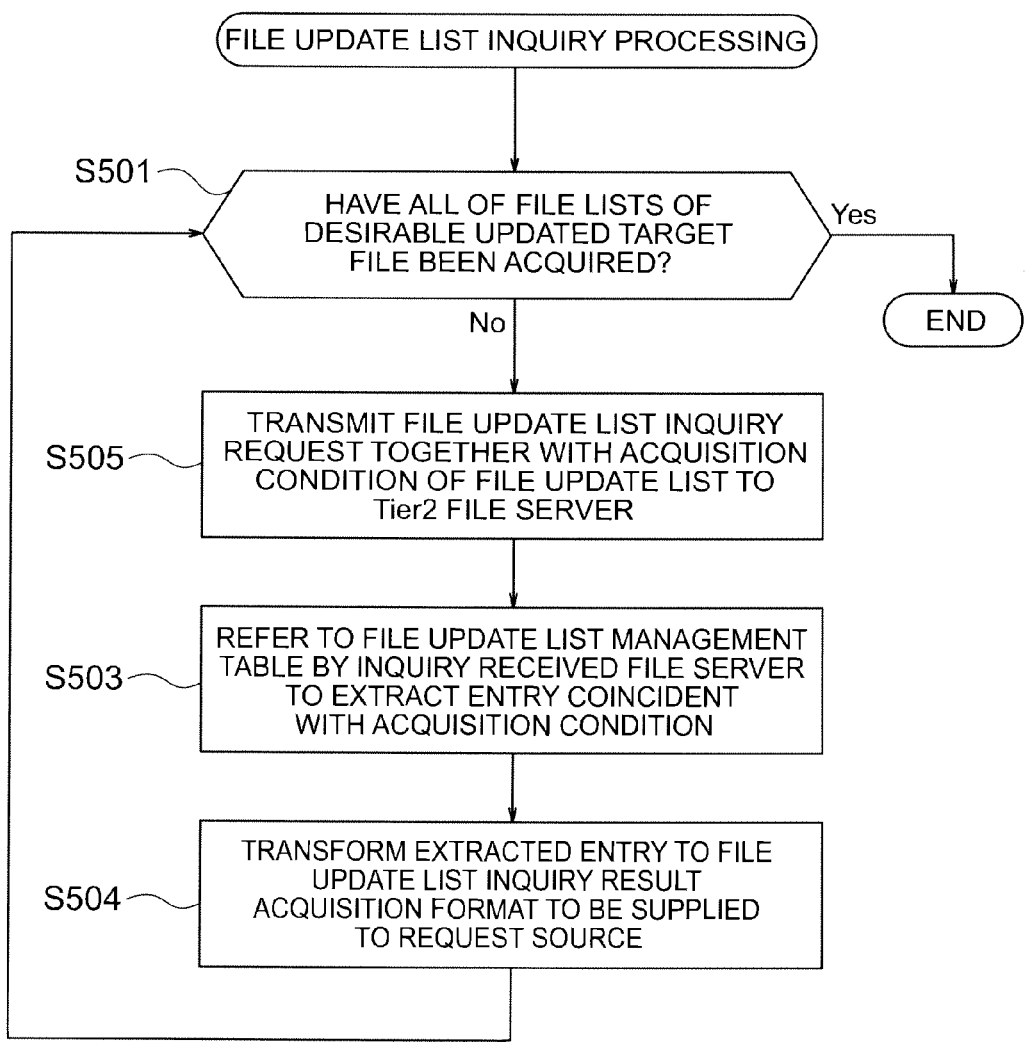
FIG. 33 is a flowchart for explaining the file update list inquiry processing in the sixth embodiment.

FIG. 33 is a flowchart showing a changed content of the file update list inquiry processing illustrated in FIG. 18. This processing sequence corresponds to the processing step S407 of the index update entirety processing illustrated in FIG. 3. This processing sequence is different in that the file update list inquiry processing is carried out for the Tier 2 file server 3100, compared with the file update list inquiry processing illustrated in FIG. 18. This processing will be described specifically below.

In FIG. 33, a changed point from FIG. 18 is that the processing at the step S502 is changed to another processing step S505. The other steps are identical to those in FIG. 18. The changed step S505 will only be described below.

If the determination in the step S501 is No, the file update list inquiry control subprogram 1171 transmits a file update list inquiry request together with an acquisition condition of the file update list to the Tier 2 file server 3100 at the step S505. A difference from FIG. 18 is simply a sending destination of the inquiry request, and the other content in the processing step S505 is identical to the step S502. in FIG. 8 After executed this processing, the processing proceeds to the step S503.

Figure 34:
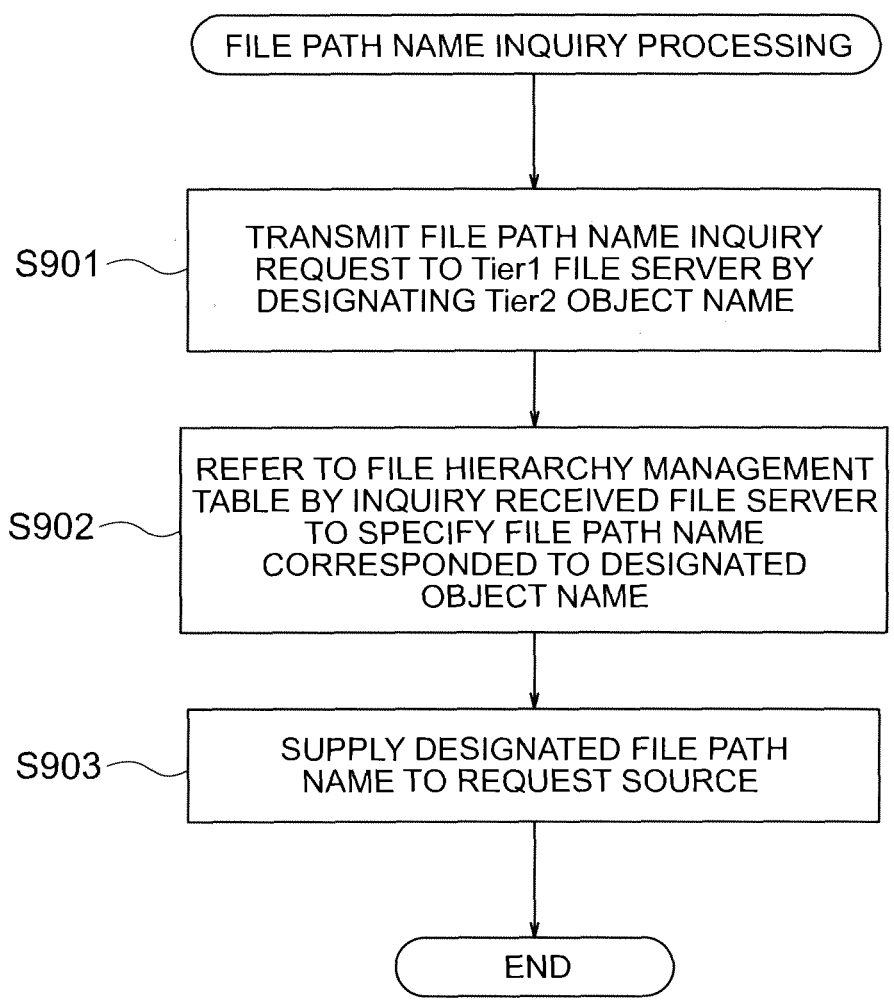
FIG. 34 is a flowchart for explaining a file path name inquiry processing the sixth embodiment.

FIG. 34 is a flowchart showing the file path name inquiry processing. First, the file access control subprogram 1172 designates an object name in the Tier 2 file server 3100 to be inquired of the path name in the Tier 1 file server 2100 to transmit the file path name inquiry request to the Tier 1 file server 2100 at a step S901. The file hierarchy management control program 2126 in the Tier 1 file server 2100 received of the inquiry request refers to the file hierarchy management table 6400 to specify a file path name corresponded to the designated object name at a step S902. Thereafter, the file hierarchy management control program 2126 supplies the specified file path name to the request source at a step S903. The file access control program 1172, acquired the file path name, in the search server 1100 can make so as to use the file path name information for the indexing processing to be carried out subsequently.

By carrying out the above-described processing, the search server 1100 inquiries the updated target file to the Tier 2 file server 3100, instead of inquiring it to the Tier 1 file server 2100, to be able to carry out the update of the index similarly to the first embodiment. By using either the above-described inquiry methods, the method for changing an inquiry destination of the updated target file can also be used for a load dispersion of the processing when the load in the system is unbalanced temporarily etc.

In addition, the invention can be configured as a control system and a control method, other than the above-described control device, and can also realize as computer programs for realizing the above-described control device, a recoding medium for recording the computer programs, and various aspects such as, including the computer programs, data signals incorporated in carrier waves.

In the case where the invention is configured as a recording medium for recording the computer programs, it may be configured as the control device or an entire program for controlling the control device, and it may also be configured as a portion carrying out the function of the invention. The recording medium can be used as a flexible disc, CD-ROM, DVD-ROM, punch card, printed matter printed with a code such as a barcode, and various volatile and nonvolatile storage mediums readable by the computer incorporating the internal and external storage medium.

It should be further understood by those skilled in the art that although foregoing description has been made on embodiments of the invention, the invention is not limited thereto and various changes and modifications may be made without departing from the spirit of the invention and the scope of the appended claims.

The invention claimed is:

1. A device comprising a search server for allowing a user to register files for a first file storage device from a client machine and acquire data of the files stored in either the first file storage device or a second file storage device, the search server comprising:

a controller configured to:
request a transmission of a file update list as a list of update files updated by the file registration from the client machine in a predetermined time period to the first file storage device;
receive the file update list, from the first file storage device, containing location information of the update files in the first file storage device and the second file storage device and management state information of the update files;
judge whether file data and metadata are acquired in accordance with the management state information contained in the file update list, as either the first file storage device or the second file storage device is set in an acquisition source, for the update files contained in the file update list;
request a transmission, to the acquisition source in response to a request from the client machine, of the file data and metadata in the update file present in a location indicated by the location information in the acquisition source;
receive the file data and metadata of the update file from the acquisition source; and
provide the received file data and metadata to the client machine,
wherein the first file storage device and the second file storage device are arranged in a tiered relationship, such that:
the first file storage device is configured to accept a file storage request from the client machine and register files based on the file storage request, and to perform replication and move processing to replicate or move a file from the first file storage device to the second file storage device; and the second file storage device is not configured to accept a file storage request from the client machine, a search index management table registering index information of the files stored in either the first file storage device or the second file storage device; and a search index registration file management table registering the location information of the first file storage device, wherein the controller is further configured to:

create a search index from the file data and metadata of the update file;

update the search index management table and the search index registration file management table in accordance with the created search index;

skip the creation of the search index and the update of the search index management table and the search index update registration file management table, in a case where the transmission request for the file data and metadata of the update file is unpermitted from the acquisition source;

acquire again the file data and metadata for the skipped file in the update, when the file update list is received next to acquire the file data and metadata of the update file;

skip a processing for creating the search index, in a case where an operation to the update file indicates a deletion in the management state information of the file update list;

acquire a search condition and account information of a search user;

acquire the file coincident with the search condition from the search index management table to extract the location information of the file from the search index registration file management table;

extract the file accessible from the search user to determine as a searched result for the extracted files, in accordance with an access limitation set in the file and an access right possessed by the search user;

transmit a list of the files accessible from the search user and the location information of the file, as the searched result, to a search request source; and create the searched result by transforming the location information into location information in the second file storage device in a case where the location information of the file contained in the searched result is location information in the first file storage device, and transforming the location information into the location information in the first file storage device in a case where the location information of the file contained in the searched result is location information in the second file storage device.

2. The device according to claim 1 wherein the file update list contains an IP address of the first file storage device and an IP address of the second file storage device, and the controller is further configured to request a transmission, to the acquisition source, by designating an IP address of the acquisition source when requesting the transmission of the file data and metadata in the update file present in the location indicated by the location information.

3. The device according to claim 1 wherein the file update list contains access control information and the metadata of a parent directory of the update file, and the controller is further configured to use the access control information and metadata of the parent directory to create the search index.

4. The device according to claim 1 wherein the file update list contains share protocol access control information set as a file-sharing level of the update file, and the controller is further configured to:

register the share protocol access control information in the search index registration file management table in a case of using a predetermined share protocol, when the transmission of the file data and metadata of the update file present in a location indicated by the location information in the acquisition source is requested to the acquisition source, and extract the file, as the searched result, in consideration of the access right based on the share protocol access control information, when the search user extracts the file having the access right from the extracted file in accordance with the account information of the search user.

5. A device comprising a search server for allowing a user to register files to a first file storage device from a client machine and acquire data of the files stored in either the first file storage device or a second file storage device, wherein the search server comprises:

a search index management table registering index information of the files stored in either the first file storage device or the second file storage device;

a search index registration file management table registering location information of the files in the first file storage device; and a controller configured to:

request a transmission, to the second file storage device, of a file update list as a list of update files updated by the file registration from the client machine in a predetermined time period;

receive, from the second file storage device, the file update list containing the location information of the update file in the first file storage device and the second file storage device and management state information of the update file;

judge whether file data and metadata are acquired in accordance with the management state information contained in the file update list, as either the first file storage device or the second file storage device is set in an acquisition source, for the update files contained in the file update list;

request a transmission, to the acquisition source in response to a request from the client machine, of the file data and metadata in the update file present in a location indicated by the location information in the acquisition source;

receive the file data and metadata of the update file from the acquisition source;

create a search index from the received file data and metadata of the update file;

update the search index management table and the search index registration file management table in accordance with the created search index; and provide the received file data and metadata to the client machine, wherein the first file storage device and the second file storage device are arranged in a tiered relationship, such that:

the first file storage device is configured to accept a file storage request from the client machine and register files based on the file storage request, and to perform replication and move processing to replicate or move a file from the first file storage device to the second file storage device; and the second file storage device is not configured to accept a file storage request from the client machine, wherein the controller is further configured to:

skip a processing for creating the search index, in a case where an operation to the update file indicates a deletion in the management state information of the file update list;

acquire a search condition and account information of a search user;

acquire the file coincident with the search condition from the search index management table to extract the location information of the file from the search index registration file management table;

extract the file accessible from the search user to determine as a searched result for the extracted files, in accordance with an access limitation set in the file and an access right possessed by the search user;

transmit a list of the files accessible from the search user and the location information of the file, as the searched result to a search request source;

create the searched result by transforming the location information into location information in the second file storage device in a case where the location information of the file contained in the searched result is location information in the first file storage device, and transforming the location information into the location information in the first file storage device in a case where the location information of the file contained in the searched result is location information in the second file storage device.

* * * * *